US011669134B2

United States Patent
Miki et al.

(10) Patent No.: US 11,669,134 B2
(45) Date of Patent: Jun. 6, 2023

(54) FIRST INFORMATION PROCESSING DEVICE, SECOND INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Hitoshi Miki, Saitama (JP); Tomohiko Nagayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 16/768,422

(22) PCT Filed: Nov. 1, 2018

(86) PCT No.: PCT/JP2018/040651
§ 371 (c)(1),
(2) Date: May 29, 2020

(87) PCT Pub. No.: WO2019/111604
PCT Pub. Date: Jun. 13, 2019

(65) Prior Publication Data
US 2020/0384354 A1    Dec. 10, 2020

(30) Foreign Application Priority Data

Dec. 8, 2017   (JP) .............................. JP2017-236110

(51) Int. Cl.
*G06F 1/16*       (2006.01)
*A63F 13/323*    (2014.01)
(Continued)

(52) U.S. Cl.
CPC .......... *G06F 1/1698* (2013.01); *A63F 13/235* (2014.09); *A63F 13/323* (2014.09); *G06K 7/10356* (2013.01); *A63F 2300/1031* (2013.01)

(58) Field of Classification Search
CPC .... G06F 1/1698; A63F 13/235; A63F 13/323; A63F 2300/1031; G06K 7/10356
See application file for complete search history.

(56) References Cited

U.S. PATENT DOCUMENTS 6,443,796 B1 *  9/2002  Shackelford ......... A63H 33/042
                                                             273/237
7,321,334 B2 *  1/2008  Yu .......................... H01Q 1/243
                                                             343/702

(Continued)

FOREIGN PATENT DOCUMENTS

CA      2963298 A1    4/2016
CN      1917928 A     2/2007
(Continued)

OTHER PUBLICATIONS

International Search Report and Written Opinion of PCT Application No. PCT/JP2018/040651, dated Jan. 15, 2019, 08 pages of ISRWO.

(Continued)

Primary Examiner — James T Tsai
(74) Attorney, Agent, or Firm — Chip Law Group

(57) ABSTRACT

It is desired to provide a device capable of performing interactive UI expression in accordance with predetermined processing. Provided is an information processing device including a first connection portion that is connected to another device, a first antenna that performs wireless communication with a reader/writer, and a communication control unit that controls wireless communication with the reader/writer via the first antenna and control wireless communication with the reader/writer via a second antenna of the another device through the first connection portion, in which the communication control unit controls reading of identification information from a memory on the basis of (Continued)

wireless communication with the reader/writer via the first antenna or the second antenna.

19 Claims, 16 Drawing Sheets

(51) Int. Cl.
 *A63F 13/235* (2014.01)
 *G06K 7/10* (2006.01)

(56) References Cited

U.S. PATENT DOCUMENTS

| | | | |
|---|---|---|---|
| 9,205,336 B1 | 12/2015 | Yano | |
| 9,361,067 B1 | 6/2016 | Yano | |
| 2002/0196250 A1* | 12/2002 | Anderson | A63H 33/042 345/420 |
| 2003/0148700 A1* | 8/2003 | Arlinsky | G09B 1/40 446/91 |
| 2007/0120752 A1* | 5/2007 | Takasu | G06F 1/1656 343/702 |
| 2007/0198694 A1 | 8/2007 | Nishino et al. | |
| 2009/0197658 A1* | 8/2009 | Polchin | A63F 13/245 463/9 |
| 2009/0264200 A1 | 10/2009 | Schwartz | |
| 2013/0196596 A1* | 8/2013 | Parekh | G06F 3/0447 455/41.1 |
| 2013/0217295 A1 | 8/2013 | Karunaratne | |
| 2014/0179446 A1* | 6/2014 | Zuniga | A63F 13/98 463/47 |
| 2014/0197991 A1* | 7/2014 | Mkrtchyan | G01S 5/02 342/464 |
| 2014/0273721 A1 | 9/2014 | Katan et al. | |
| 2014/0274412 A1* | 9/2014 | Sabo | A63F 9/24 463/42 |
| 2015/0258435 A1* | 9/2015 | Zhang | A63F 13/24 463/36 |
| 2016/0256791 A1 | 9/2016 | Yano | |
| 2017/0225073 A1* | 8/2017 | Laulund | A63F 13/40 |
| 2017/0252664 A1* | 9/2017 | Cletheroe | A63H 33/046 |
| 2018/0078863 A1* | 3/2018 | Nielsen | A63F 13/42 |
| 2019/0155341 A1* | 5/2019 | Sobel | G06F 11/3062 |
| 2020/0179815 A1 | 6/2020 | Nielsen et al. | |

FOREIGN PATENT DOCUMENTS

| | | |
|---|---|---|
| CN | 106999785 A | 8/2017 |
| CN | 107708823 A | 2/2018 |
| CN | 108778437 A | 11/2018 |
| CN | 113612550 A * | 11/2021 |
| EP | 1581315 A1 | 10/2005 |
| EP | 1720321 A1 | 11/2006 |
| EP | 3200886 A1 | 8/2017 |
| EP | 3280504 A1 | 2/2018 |
| EP | 3426367 A1 | 1/2019 |
| JP | 06-195529 A | 7/1994 |
| JP | 2000-102674 A | 4/2000 |
| JP | 2005-224449 A | 8/2005 |
| JP | 2006-501924 A | 1/2006 |
| JP | 2008-012207 A | 1/2008 |
| JP | 2011-005002 A | 1/2011 |
| JP | 2015-051064 A | 3/2015 |
| JP | 2017-537669 A | 12/2017 |
| JP | 2018-516109 A | 6/2018 |
| KR | 10-2007-0037566 A | 4/2007 |
| KR | 10-2017-0063838 A | 6/2017 |
| KR | 10-2017-0134644 A | 12/2017 |
| WO | 2004/033056 A1 | 4/2004 |
| WO | 2005/079040 A1 | 8/2005 |
| WO | 2015/033656 A1 | 3/2015 |
| WO | 2016/050757 A1 | 4/2016 |
| WO | 2016/140759 A1 | 9/2016 |
| WO | 2016/162403 A1 | 10/2016 |
| WO | 2017/155725 A1 | 9/2017 |

OTHER PUBLICATIONS

Extended European Search Report of EP Application No. 18885557.1, dated May 11, 2021, 09 pages.

* cited by examiner

FIRST INFORMATION PROCESSING DEVICE, SECOND INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2018/040651 filed on Nov. 1, 2018, which claims priority benefit of Japanese Patent Application No. JP 2017-236110 filed in the Japan Patent Office on Dec. 8, 2017. Each of the above-referenced applications is hereby incorporated herein by reference in its entirety.

TECHNICAL FIELD

The present disclosure relates to a first information processing device, a second information processing device, an information processing method, a program, and an information processing system.

BACKGROUND ART

In recent years, opportunities to enjoy games by using information processing terminals such as smartphones and tablets have been increased with development of information processing technology. Further, integration of a digital game executed on an information processing terminal with a game using things has also been attempted.

For example, there is disclosed a technology of providing a light emitting display unit on a surface of a card substrate and supplying power for light emission of this light emitting display unit from a card reader, thereby obtaining a desired light emitting mode without increasing a thickness of the card and enhancing a utility value of the card (e.g., see Patent Document 1).

There is also disclosed a technology of, by applying electronic paper technology, allowing a specified number of pieces of electronic paper to be used as game cards in such a manner that patterns, numbers, symbols, and the like corresponding to each game can be displayed in a switchable manner on display surfaces of the electronic paper so that the electronic paper can be used as various game cards (e.g., see Patent Document 2).

Further, there is also disclosed a technology of giving visual enjoyment to a user by causing each operation element of an input operation device to blink or emit light (e.g., see Patent Document 3).

CITATION LIST

Patent Document

Patent Document 1: Japanese Patent Application Laid-Open No. 06-195529
Patent Document 2: Japanese Patent Application Laid-Open No. 2008-12207
Patent Document 3: Japanese Patent Application Laid-Open No. 2000-102674

SUMMARY OF THE INVENTION

Problems to be Solved by the Invention

However, expression by an interactive user interface using a device (hereinafter, also referred to as "UI expression") has not been generally realized. In view of this, it is desired to provide a device capable of performing interactive UI expression in accordance with predetermined processing.

Solutions to Problems

The present disclosure provides a first information processing device including: a first connection portion that is connected to a second information processing device; a first antenna configured to perform wireless communication with an external device; and a communication control unit configured to control wireless communication with the external device via the first antenna and control wireless communication with the external device via a second antenna of the second information processing device through the first connection portion, in which the first information processing device is engageable with the second information processing device, and the communication control unit controls reading of identification information from a memory on the basis of wireless communication with the external device via the first antenna or the second antenna.

The present disclosure provides an information processing method by a processor, the processor controlling wireless communication with an external device via a first antenna and controlling wireless communication with the external device via a second antenna of a second information processing device through a first connection portion, a first information processing device that includes the processor being engageable with the second information processing device, the information processing method, by the processor, including: controlling reading of identification information from a memory on a basis of wireless communication with the external device via the first antenna or the second antenna.

The present disclosure provides a program for causing a computer to function as a first information processing device including a communication control unit configured to control wireless communication with an external device via a first antenna and control wireless communication with the external device via a second antenna of a second information processing device through a first connection portion, in which the first information processing device is engageable with the second information processing device, and the communication control unit controls reading of identification information from a memory on the basis of wireless communication with the external device via the first antenna or the second antenna.

The present disclosure provides a second information processing device including: a second connection portion that is connected to a first information processing device; a second antenna configured to perform wireless communication with an external device under the control of a communication control unit of the first information processing device via the second connection portion; a user interface unit; and an operation control unit configured to control, in a case where the second antenna receives an operation request from the external device, the user interface unit so that output is performed by the user interface unit on the basis of the operation request, in which the second information processing device is engageable with the first information processing device.

The present disclosure provides an information processing method, by a processor, including, in a case where a second antenna receives an operation request from an external device under the control of a communication control unit of a first information processing device via a second connection portion, controlling a user interface unit so that output is performed by the user interface unit on the basis of the operation request, in which a second information processing device including the processor is engageable with the first information processing device.

The present disclosure provides a program for causing a computer to function as a second information processing device including an operation control unit configured to control, in a case where a second antenna receives an operation request from an external device under control of a communication control unit of a first information processing device via a second connection portion, a user interface unit so that output is performed by the user interface unit on the basis of the operation request, in which the second information processing device is engageable with the first information processing device.

The present disclosure provides an information processing system including: a first information processing device; and a second information processing device, in which the first information processing device is engageable with the second information processing device, the first information processing device includes a first connection portion that is connected to the second information processing device, a first antenna configured to perform wireless communication with an external device, and a communication control unit configured to control wireless communication with the external device via the first antenna and control wireless communication with the external device via a second antenna of the second information processing device through the first connection portion, the communication control unit controls reading of identification information from a memory on the basis of wireless communication with the external device via the first antenna or the second antenna, the second information processing device includes a second connection portion that is connected to the first information processing device, the second antenna, a user interface unit, and an operation control unit configured to control, in a case where the second antenna receives an operation request from the external device, the user interface unit so that output is performed by the user interface unit on the basis of the operation request.

Effects of the Invention

As described above, the present disclosure can provide a device capable of performing interactive UI expression in accordance with predetermined processing. Note that the above effects are not necessarily limited, and any of the effects described in the present specification or other effects that can be grasped from the present specification may be exhibited in addition to or in place of the above effects.

MODE FOR CARRYING OUT THE INVENTION

Hereinafter, preferred embodiments of the present disclosure will be described in detail with reference to the accompanying drawings. Note that, in this specification and the drawings, components having substantially the same functional configurations will be represented as the same reference signs, and repeated description thereof will be omitted.

Further, in this specification and the drawings, a plurality of components having substantially the same or similar functional configuration may be distinguished from each other by adding different numbers to the same reference sign. However, in a case where it is unnecessary to individually distinguish the plurality of components having substantially the same or similar functional configuration in particular, those components are denoted only by the same reference sign. Further, similar components in different embodiments may be distinguished from each other by adding different alphabets to the same reference sign. However, in a case where it is unnecessary to individually distinguish the similar components in particular, those components are denoted only by the same reference sign.

Further, description will be provided in the following order.

0. Overview of information processing system
1. Details of information processing system
1-1. State of single basic pedestal
1-2. Combined state between basic pedestal and extended pedestal
1.3. Structure of game device
1.4. Usefulness of separating game device
1.5. Functional configuration example of game device
1.6. Modification examples of countermeasure against collision between wireless communications
1.7. Operation examples
2. Conclusion

0. OVERVIEW OF INFORMATION PROCESSING SYSTEM

Figure 1:
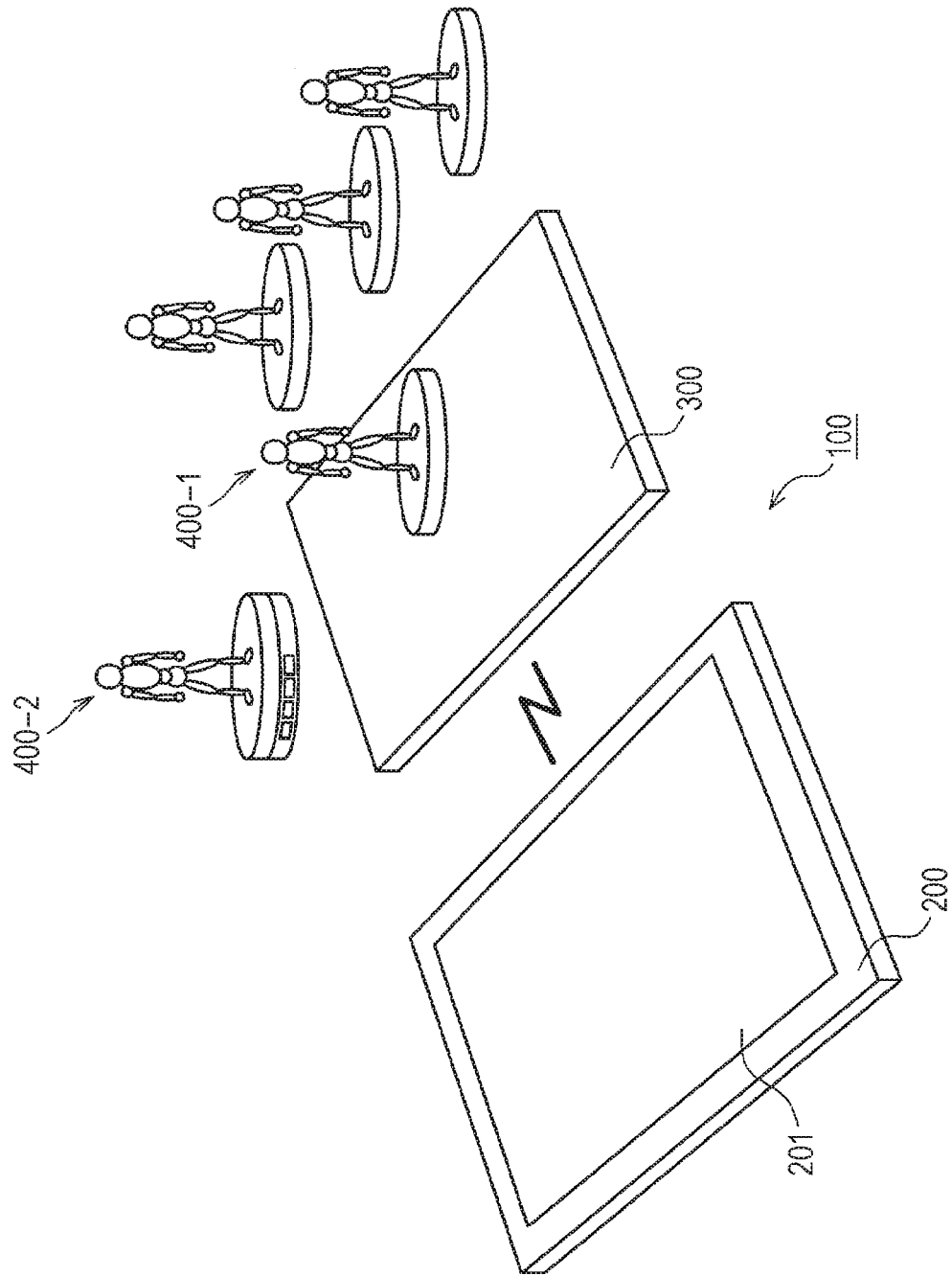
FIG. 1 illustrates an example of an external configuration of an information processing system according to this embodiment.

FIG. 1 illustrates an example of an external configuration of an information processing system 100 capable of implementing an application such as a game by using short-range wireless communication technology. Further, FIG. 2 illustrates an example of a state in which a single user plays a game by using the information processing system 100.

Figure 2:
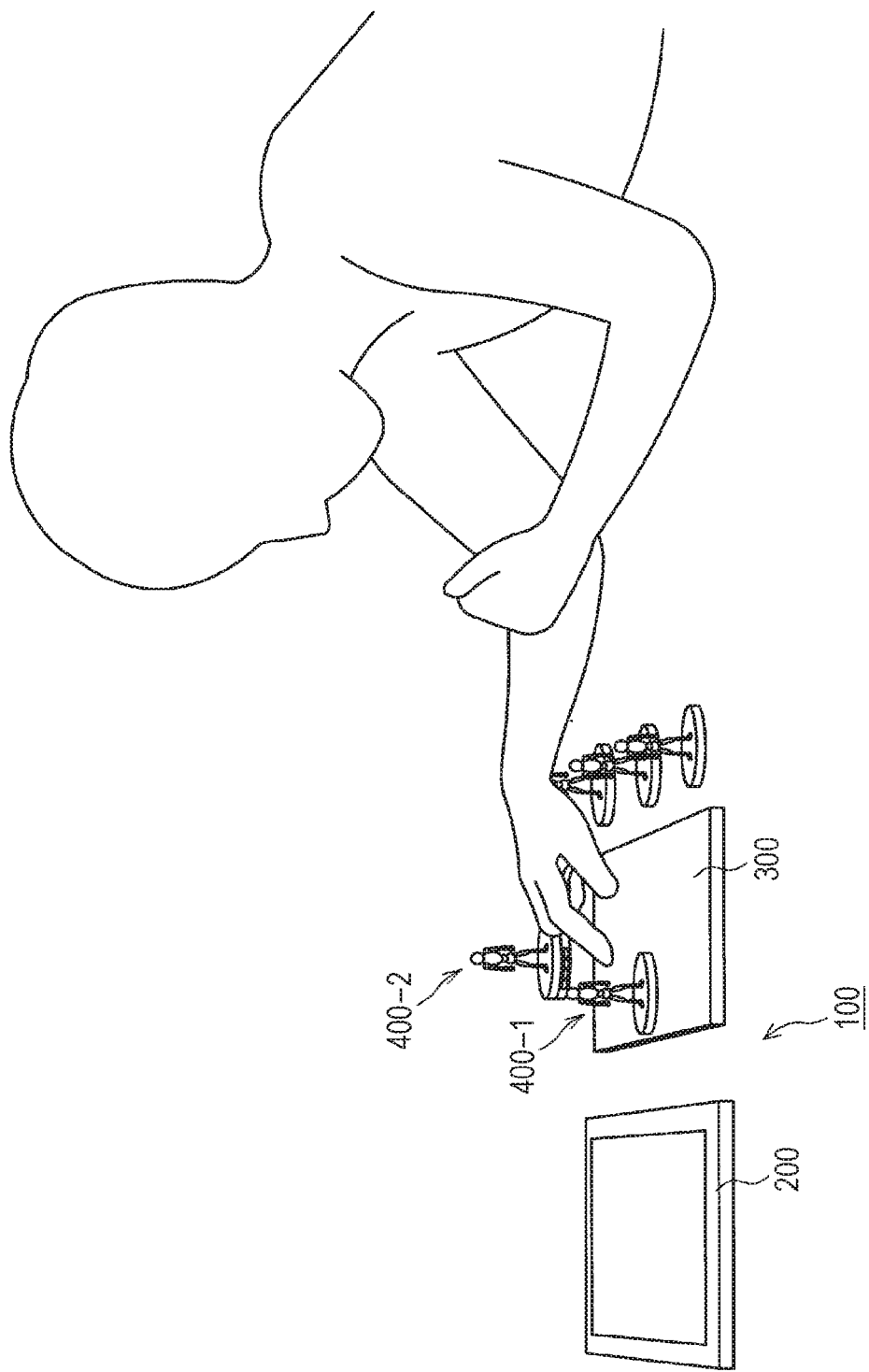
FIG. 2 illustrates an example of a state in which a single user plays a game by using the information processing system according to this embodiment.

The information processing system 100 illustrated in FIGS. 1 and 2 includes a game console main body 200 and a pad device 300. The game console main body 200 includes, for example, a general-purpose information terminal such as a smartphone or a tablet, and executes a game application. An upper surface of the game console main body 200 is a screen 201 for displaying video of the game. The screen 201 may be a touchscreen display, and a user who is a player of the game can directly perform input operation on the screen 201 with his/her fingertip.

Meanwhile, the pad device 300 is a plate-shaped device on which the user who is a player of the game performs operation, such as placing devices including figures corresponding to characters, weapons, and loot (hereinafter, also referred to as "game devices") 400-1, 400-2, . . . . As described below, in the pad device 300, antenna coils to communicate with RFID tags embedded in the respective game devices 400-1, 400-2, . . . are arranged in a two-dimensional array.

The pad device 300 can also be regarded as an external device of the information terminal. The game console main body 200 and the pad device 300 are connected to each other via wireless communication such as Bluetooth (registered trademark). As a matter of course, it is also conceivable to connect the game console main body 200 and the pad device 300 in a wired manner by using a cable such as a universal serial bus (USB). Further, the game console main body 200 is assumed to be connected to a wide area network such as the Internet via a wireless fidelity (Wi-Fi) (registered trademark) or Ethernet (registered trademark) cable.

(Game Fused with Things)

Herein, in this embodiment, originally virtual digital information such as characters, weapons, and loot used in a digitized game can be treated as real material objects such as cards and figures, and a digital game executed in the game console main body 200 can be combined with a game using things.

For example, when an RFID tag is attached to inside or outside of a real object such as a card or a figure and the user who is a player of the game appropriately places the card or figure on the pad device 300 during the game, the game console main body 200 can read information from the RFID tag attached to the inside or outside of the card or figure via the pad device 300 in accordance with progress of the executed game (growth of a character, depletion of a weapon, acquisition of loot, and the like) or can rewrite the information of the RFID tag.

For convenience, this embodiment will be described by mainly assuming a game using figures. The figures are assumed to be produced by imitating appearance (e.g., shape, color, size, and the like) of characters, weapons, loot, and the like appearing in the game. Further, each figure is preferably formed integrally with a pedestal. Then, the figure can be stably placed on the pad device 300 by placing the pedestal on the pad device 300. Note that, as described below, the pedestal on which the figure is formed may be directly placed on the pad device 300, or may be placed on another pedestal to be indirectly placed on the pad device 300.

Further, in the examples illustrated in FIGS. 1 and 2, a single user enjoys the game executed in the game console main body 200 while operating the game devices on the pad device 300. However, the number of users of the game is not limited to one. Two or more users can also participate in the game executed in the game console main body 200 while operating the game devices by using their respective dedicated pad devices 300. That is, the pad device 300 may be additionally provided for each participant in the game.

(Background)

Herein, among figures used in the game field, there are products having a near field communication (NFC) function. Such products can perform wireless communication using NFC with a device facing the products. However, such products do not have a user interface. This makes it difficult to improve fun of the game (hereinafter, also referred to as "game characteristics") or to enhance a user experience.

Therefore, in this embodiment, a technology of improving the game characteristics and enhancing the user experience by using a game device having a user interface (UI) will be described. For example, there is provided a game device capable of performing interactive UI expression in accordance with predetermined processing (e.g., processing performed by a game application, or the like) because a user interface (light emitting diode (LED), switch, speaker, vibration motor, and the like) and a processor for controlling the user interface are mounted on the game device.

With such a game device, expression according to execution of the game can be given by the game device, in addition to a normal decoration for the game device (figure). As an example, expression (e.g., lighting of the LED, and the like) that matches a timing at which a character appearing in the game shows a technique can be given by the game device.

Further, according to this embodiment, the game console main body and the game device can realize wireless communication via the pad device in response to a command from the game console main body. Thus, various expressions can be achieved by cooperatively performing the game console main body and the game device. As an example, it is possible to transmit information regarding the figure from the game console main body to the user and transmit user operation regarding the figure to the game console main body. With this configuration, it is expected that an interactive UI is realized and possibilities of the game are expanded.

Figure 3:
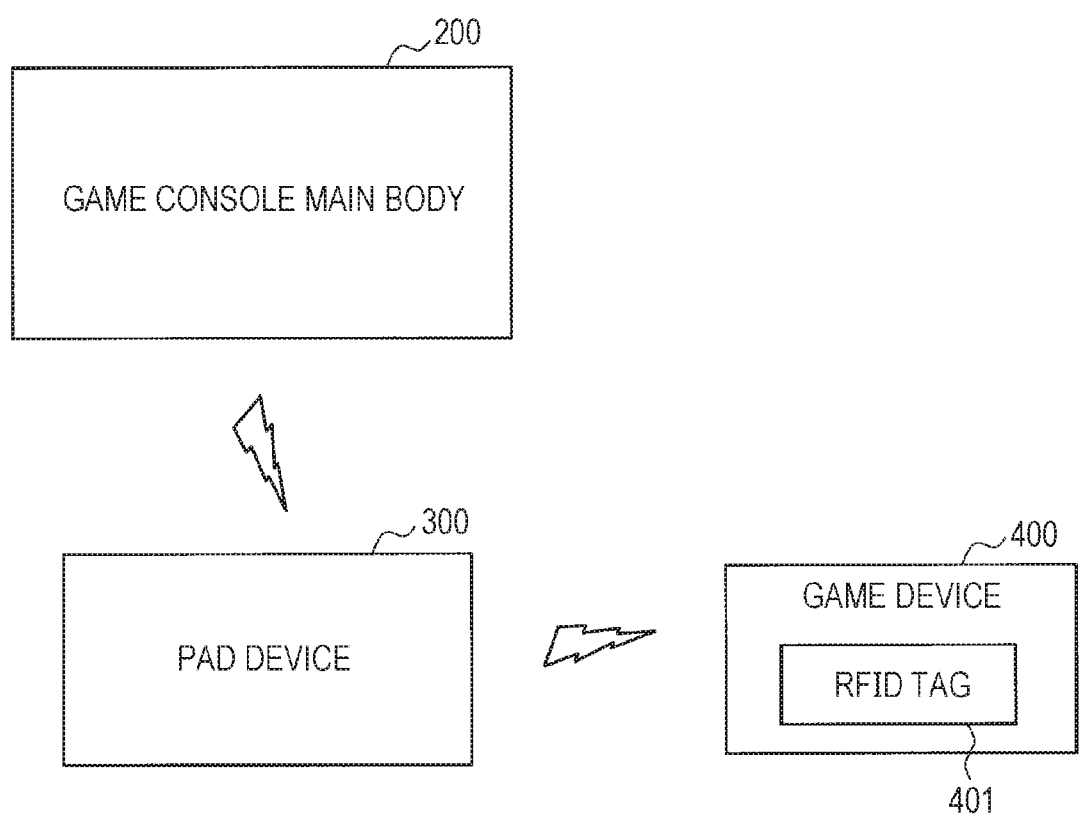
FIG. 3 illustrates an example of an overall configuration of the information processing system according to this embodiment.

Next, an overall configuration of such an information processing system 100 according to this embodiment will be described with reference to FIG. 3. FIG. 3 illustrates an example of an overall configuration of the information processing system 100 according to this embodiment.

As illustrated in FIG. 3, the information processing system 100 according to this embodiment includes the game console main body 200, the pad device 300, and the game device 400.

(Game Console Main Body 200)

The game console main body 200 is realized by, for example, an information processing terminal such as a smartphone or a tablet, and executes a game application. An upper surface of the game console main body 200 is a screen 201 for displaying video of the game. The screen 201 may be a touchscreen display, and a user who is a player of the game can directly perform input operation on the screen 201 with his/her fingertip.

Further, the game console main body 200 can also be connected to a wide area network such as the Internet via a Wi-Fi (registered trademark) or Ethernet (registered trademark) cable to intercommunicate with a server (not illustrated) installed on the network.

Further, the game console main body 200 can realize interaction using video or audio of the game corresponding to the game device 400 by controlling output of video and audio on the screen 201 on the basis of information read from an RFID tag 401 in the game device 400 placed on the pad device 300 or touch operation input by the user on the pad device 300. For example, the game console main body 200 performs control for causing video of a character corresponding to a figure of the game device 400 to appear on the screen 201.

Further, the game console main body 200 can also realize interaction using video and audio of the game in response to user operation on the game device 400 placed on the pad device 300, such as removing the game device 400 from the pad device 300, changing a position of the game device 400, and moving the game device 400 back and forth or left and right, or touch operation input by the user on the pad device 300. For example, the game console main body 200 controls output of video and audio, such as switching of a screen or progress of the game, in response to the kind of the game device 400 that the user places on the pad device 300, a position and orientation of the game device 400 placed on the pad device 300, movement of the game device 400 on the pad device 300, a tap, double tap, swipe, or flick operation by the user, or the like. Further, for example, a pointer displayed on the screen 201 of the game console main body 200 is moved in response to operation in which the user performs dragging with his/her finger on the pad device 300. Alternatively, in response to operation in which the user performs tapping with his/her finger on the pad device 300, it is recognized that the user presses a button displayed at a corresponding position on an operation screen displayed on the screen 201 of the game console main body 200.

Further, the game console main body 200 can record information such as a state of the character (degree of growth, emotion, degree of fatigue, and the like) and a score of the game on the RFID tag 401 in the game device 400 via the pad device 300 in accordance with the progress of the game. A more specific configuration of the game console main body 200 according to this embodiment will be described below.

(Pad Device 300)

As can also be seen from FIG. 1, the pad device 300 has a plate-shaped housing structure, and is provided for use by placing the housing on a floor or desk so that an operation surface faces upward, the operation surface being an operation surface on which the user who is a player of the game performs operation of placing the game device 400 corresponding to a character, weapon, or loot, operation of moving the game device 400, or touch operation. In the pad device 300, the antenna coils to communicate with the RFID tag 401 attached to the outside or inside of each game device 400 are arranged in a two-dimensional array. A more specific configuration of the pad device 300 according to this embodiment will be described below.

(Game Device 400)

The game device 400 is a so-called "integrated circuit (IC) card" in which the RFID tag 401 is embedded in the pedestal on which the figure made from paper, resin, or the like is formed. The RFID tag 401 includes a communication function module capable of performing short-range wireless communication based on a predetermined standard with a reader/writer of the pad device 300 and a storage function (memory) module from or into which the reader/writer reads or writes information by using this short-range wireless communication. The antenna coils for short-range wireless communication are formed in the game device 400. Further, the figure imitating the appearance (e.g., shape, color, size, and the like) of the character, weapon, loot, or the like appearing in the game is formed on the game device 400. A more specific configuration of the game device 400 according to this embodiment will be described below.

The information processing system according to the embodiment of the present disclosure has been described above.

Note that, in the following description, a case where a switch and an LED are used as examples of the user interface will be mainly described. However, the user interface is not limited to such examples. In the user interface, an input unit may be a touchscreen, a button, or another sensor device. Further, in the user interface n, the input unit may be a speaker or a vibration motor.

1. DETAILS OF INFORMATION PROCESSING SYSTEM

Next, details of the information processing system according to the embodiment of the present disclosure will be described.

1.1. State of Single Basic Pedestal

Figure 4:
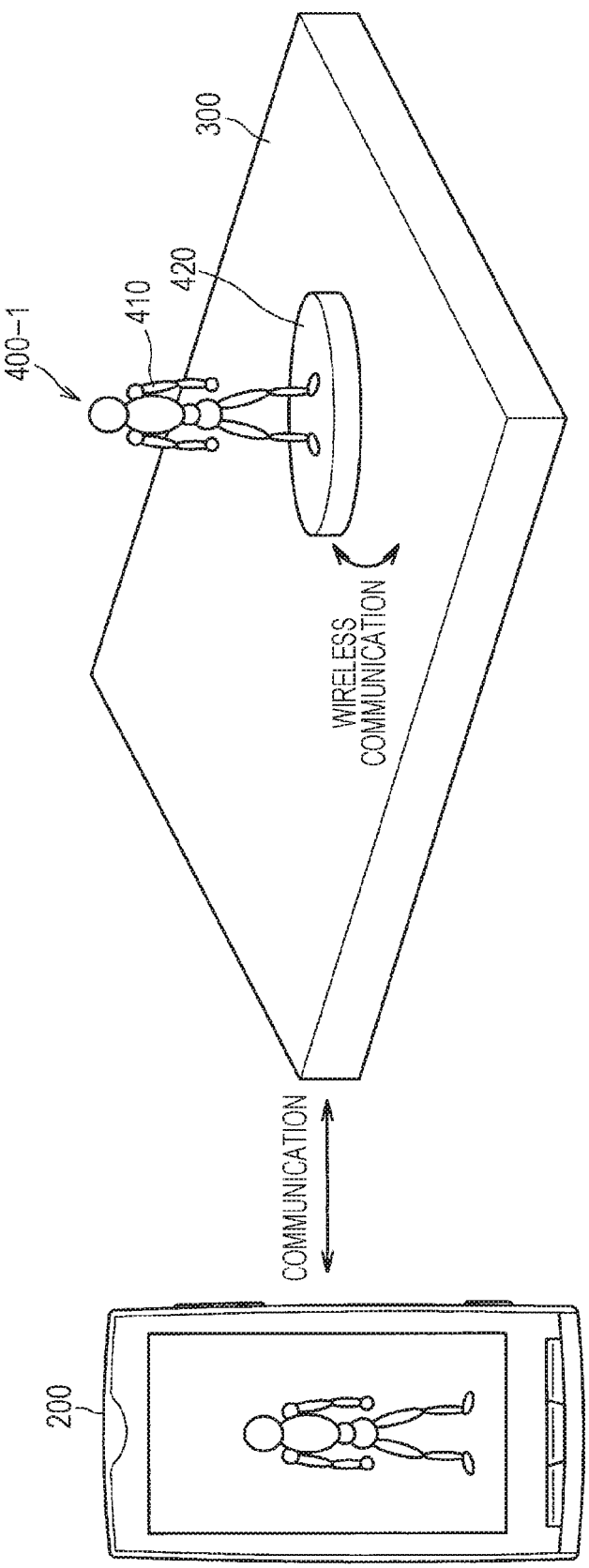
FIG. 4 illustrates an example of a usage status of an information processing system according to an embodiment of the present disclosure.

First, an example of a usage status of the information processing system according to the embodiment of the present disclosure will be described. FIG. 4 illustrates an example of a usage status of the information processing system according to the embodiment of the present disclosure. FIG. 4 illustrates the game console main body 200, the pad device 300, and the game device 400-1. The game device 400-1 includes a pedestal (hereinafter, also referred to as "basic pedestal 420") integrally formed with a FIG. 410.

As described above, in this embodiment, the game device 400-1 including the basic pedestal 420 is assumed to be a form of the game device 400. Hereinafter, a state in which an extended pedestal 430 (FIG. 5) described below is not connected to the basic pedestal 420 as illustrated in FIG. 4 will also be referred to as "state of the single basic pedestal". The basic pedestal 420 can function as a first information processing device, and the extended pedestal 430 can function as a second information processing device. Note that usefulness of separating the game device 400 into the basic pedestal 420 and the extended pedestal 430 (FIG. 5) will be described below.

In the following description, the FIG. 410 is assumed to be an object imitating the appearance of the character appearing in the game. However, the FIG. 410 may imitate appearance of a weapon, loot, or the like appearing in the game. Further, an antenna is embedded in the basic pedestal 420. In addition, the basic pedestal 420 has a short-range wireless communication function based on the predetermined standard using the antenna. Meanwhile, the pad device 300 includes a reader/writer. That is, the antenna of the basic pedestal 420 and the reader/writer of the pad device 300 can perform short-range wireless communication based on the predetermined standard. The reader/writer can function as an external device of the game device 400.

The game console main body 200 executes a game application. For example, the game console main body 200 can display a screen suitable for the progress of the game. Further, the game console main body 200 and the pad device 300 can perform wireless communication with each other. However, as described above, the game console main body 200 and the pad device 300 may perform wired communication.

Identification information (identification information of the RFID tag) is recorded on a memory of the basic pedestal 420. The identification information may be information related to the FIG. 410. As an example, the identification information may be information for identifying the FIG. 410. Then, the game console main body 200 can identify the FIG. 410 formed on the basic pedestal 420 on the basis of the identification information read by the pad device 300 from the memory of the basic pedestal 420.

Further, individual information related to the identification information is recorded on the memory of the basic pedestal 420. The individual information may be information indicating characteristics of the character corresponding to the FIG. 410 (e.g., strength and the like of the character). The individual information recorded on the memory of the basic pedestal 420 may be appropriately updated by the pad device 300 under the control of the game console main body 200.

Further, operation information related to operation of the extended pedestal 430 described below can be recorded on the memory of the basic pedestal 420. The operation information recorded on the memory of the basic pedestal 420 may also be appropriately updated by the pad device 300 under the control of the game console main body 200. Note that, in the following description, a predetermined operation pattern will be used as an example of the operation information. However, the operation information is not limited to such an example. In particular, in the following description, an LED lighting pattern will be used as an example of the operation pattern.

As illustrated in FIG. 4, the user can place the game device 400-1 on the pad device 300 during the progress of the game. At this time, when the identification information and the individual information are read by the reader/writer of the pad device 300 from the memory of the basic pedestal 420 via short-range wireless communication and are acquired by the game console main body 200 from the pad device 300 via wireless communication, the game console main body 200 may advance the game in accordance with the acquired identification information and individual information.

For example, as illustrated in FIG. 4, the game console main body 200 may display, on the screen, an image related to the FIG. 410 (e.g., an image corresponding to the FIG. 410, or the like) identified on the basis of the acquired identification information. When the user visually recognizes the image displayed on the screen in this way, the user can grasp that the game device 400-1 placed on the pad device 300 is recognized. Further, the game console main body 200 may use the acquired individual information (e.g., the strength and the like of the character) for the progress of the game.

The example of the usage status of the information processing system according to the embodiment of the present disclosure has been described above.

1.2. Combined State Between Basic Pedestal and Extended Pedestal

Figure 5:
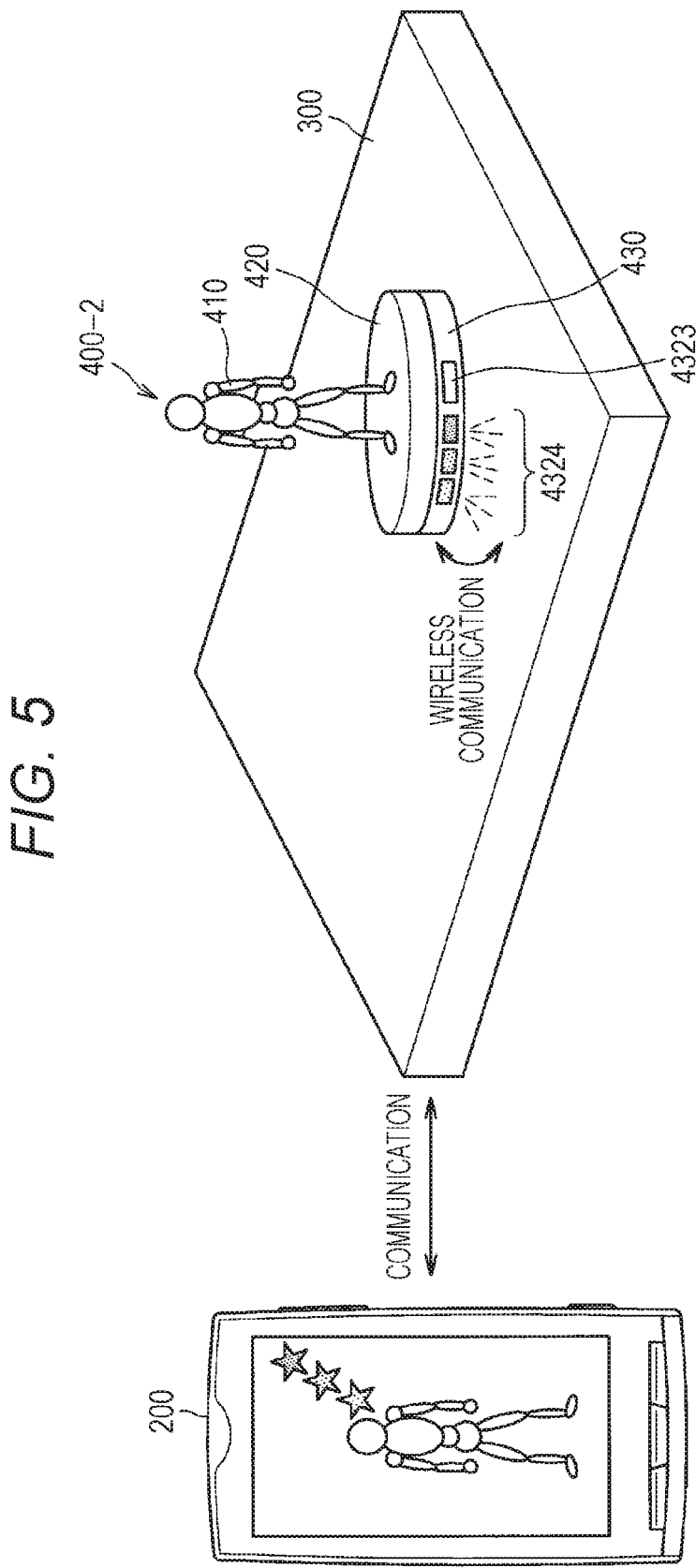
FIG. 5 illustrates another example of a usage status of an information processing system according to an embodiment of the present disclosure.

Next, another example of the usage status of the information processing system according to the embodiment of the present disclosure will be described. FIG. 5 illustrates another example of the usage status of the information processing system according to the embodiment of the present disclosure. FIG. 5 illustrates the game console main body 200, the pad device 300, and the game device 400-2. The basic pedestal 420 and the extended pedestal 430 are engageable, and the game device 400-2 includes not only the basic pedestal 420 but also a pedestal connected to the basic pedestal 420 (hereinafter, also referred to as "extended pedestal").

Thus, in this embodiment, the game device 400-2 including the basic pedestal 420 and the extended pedestal 430 is assumed to be another form of the game device 400. Hereinafter, a state in which the extended pedestal 430 is connected to the basic pedestal 420 as illustrated in FIG. 5 will also be referred to as "combined state between the basic pedestal and the extended pedestal".

An antenna is embedded in the extended pedestal 430. In addition, the extended pedestal 430 has a short-range wireless communication function based on the predetermined standard using the antenna. The antenna of the extended pedestal 430 and the reader/writer of the pad device 300 can perform short-range wireless communication based on the predetermined standard.

Note that, as illustrated in FIG. 5, in a case where the extended pedestal 430 is placed on the pad device 300 while the extended pedestal 430 is being connected to a lower surface of the basic pedestal 420, a distance between the extended pedestal 430 and the pad device 300 is smaller than a distance between the basic pedestal 420 and the pad device 300. Therefore, it can be said that the extended pedestal 430 is more suitable for wireless communication with the pad device 300 than the basic pedestal 420. However, a collision may occur between wireless communication using the antenna of the basic pedestal 420 and wireless communication using the antenna of the extended pedestal 430. A countermeasure against the collision between the wireless communication using the antenna of the basic pedestal 420 and the wireless communication using the antenna of the extended pedestal 430 will be described below.

In the combined state between the basic pedestal and the extended pedestal (FIG. 5), as well as in the state of the single basic pedestal (FIG. 4), the pad device 300 may read the identification information, the individual information, and the operation information recorded on the memory of the basic pedestal 420 and update the individual information and the operation information recorded on the memory of the basic pedestal 420 under the control of the game console main body 200. However, in the combined state between the basic pedestal and the extended pedestal (FIG. 5), the antenna of the extended pedestal 430 is mainly used for short-range wireless communication with the pad device 300.

The extended pedestal 430 includes a user interface unit, and the user interface unit includes an input unit and an output unit. In the example illustrated in FIG. 5, the extended pedestal 430 includes a switch 4323 as an example of the input unit, and includes an LED 4324 as an example of the output unit. However, as described below, the switch 4323 is also merely an example of the input unit, and the input unit is not limited to the switch. Further, the LED 4324 is merely an example of the output unit, and the output unit is not limited to the LED 4324.

The switch 4323 can be operated by the user. For example, the user can turn on the switch 4323 and can also turn off the switch 4323. For example, when the antenna of the extended pedestal 430 receives a state check request from the game console main body 200 via the pad device 300, the extended pedestal 430 returns a state check response including a state of the switch 4323 (e.g., whether the switch is on or off) to the game console main body 200 via the pad device 300.

As described above, the operation information (LED lighting pattern) related to operation of the extended pedestal 430 can be recorded on the memory of the basic pedestal 420. Then, when the antenna of the extended pedestal 430 receives a UI operation request including information that specifies the LED lighting pattern from the game console main body 200 via the pad device 300, the extended pedestal 430 reads the LED lighting pattern from the memory of basic pedestal 420 and controls lighting of the LED 4324 in accordance with the read LED lighting pattern.

Note that, herein, the LED lighting pattern is assumed to be recorded on the memory of the basic pedestal 420 in advance. However, the LED lighting pattern is also assumed to be included in the UI operation request. In such a case, when the antenna of the extended pedestal 430 receives the UI operation request including the LED lighting pattern from the game console main body 200 via the pad device 300, the extended pedestal 430 only needs to acquire the LED lighting pattern from the UI operation request and control lighting of the LED 4324 in accordance with the acquired LED lighting pattern.

As illustrated in FIG. 5, the user can place the game device 400-2 on the pad device 300 during the progress of the game. In this case, as well as in the case where the game device 400-1 is placed on the pad device 300 (FIG. 4), when the identification information and the individual information are read by the reader/writer of the pad device 300 from the memory of the basic pedestal 420 via short-range wireless communication and are acquired by the game console main body 200 from the pad device 300 via wireless communication, the game console main body 200 may advance the game in accordance with the acquired identification information and individual information.

For example, as illustrated in FIG. 5, as well as in the case where the game device 400-1 is placed on the pad device 300 (FIG. 4), the game console main body 200 may display, on the screen, an image related to the FIG. 410 (e.g., an image corresponding to the FIG. 410) identified on the basis of the acquired identification information. Further, the game console main body 200 may use the acquired individual information (e.g., the strength and the like of the character) for the progress of the game. Further, as illustrated in FIG. 5, in a case where lighting of the LED 4324 has been controlled, the game console main body 200 may reflect lighting of the LED 4324 on the screen.

The another example of the usage status of the information processing system according to the embodiment of the present disclosure has been described above.

1.3. Structure of Game Device

Figure 6:
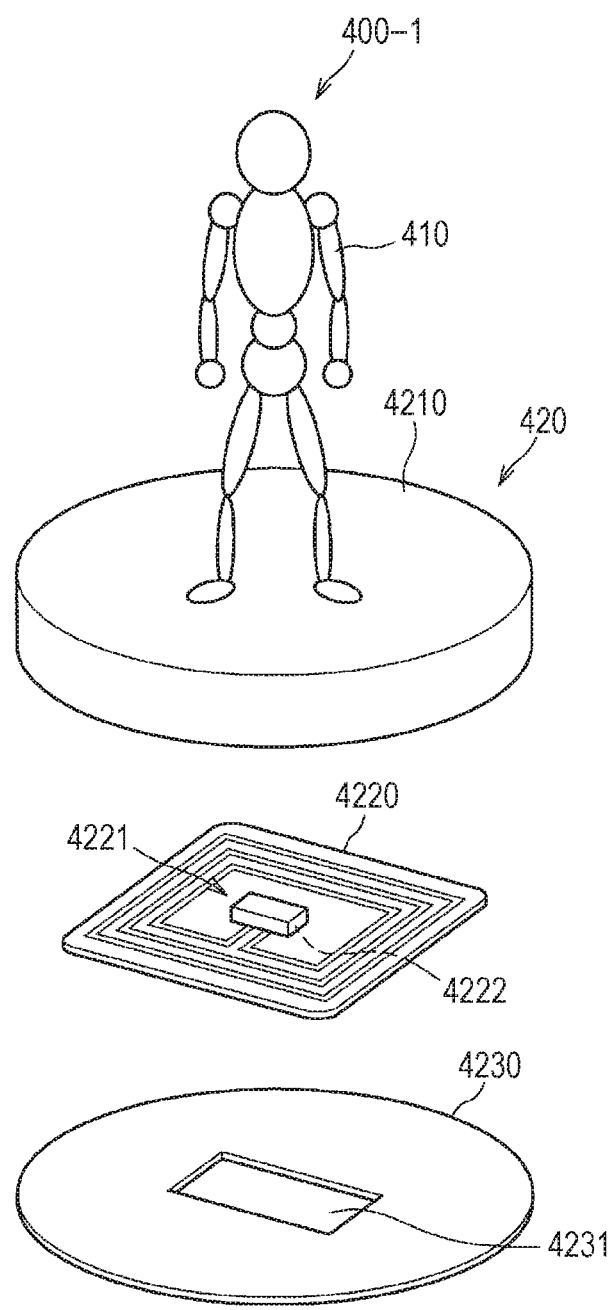
FIG. 6 is an exploded perspective view of a game device including a basic pedestal.

Next, a structure of the game device 400 will be described. FIG. 6 is an exploded perspective view of the game device 400-1 including the basic pedestal. As illustrated in FIG. 6, the basic pedestal 420 includes an upper lid 4210, a lower lid 4230, and a substrate 4220. The FIG. 410 is formed on the upper lid 4210. In addition, the substrate 4220 can be held in a space that is generated inside the upper lid 4210 and the lower lid 4230 when the upper lid 4210 and the lower lid 4230 are fitted.

An IC chip 4221 is formed on an upper surface of the substrate 4220. Further, a first connection portion (hereinafter, also referred to as "extended pedestal connection portion") 4222 to be connected to the extended pedestal 430 is formed on a lower surface of the substrate 4220. A hole 4231 is formed in the lower lid 4230. The extended pedestal connection portion 4222 passes through the hole 4231 when the extended pedestal connection portion 4222 is connected to the extended pedestal 430.

Figure 7:
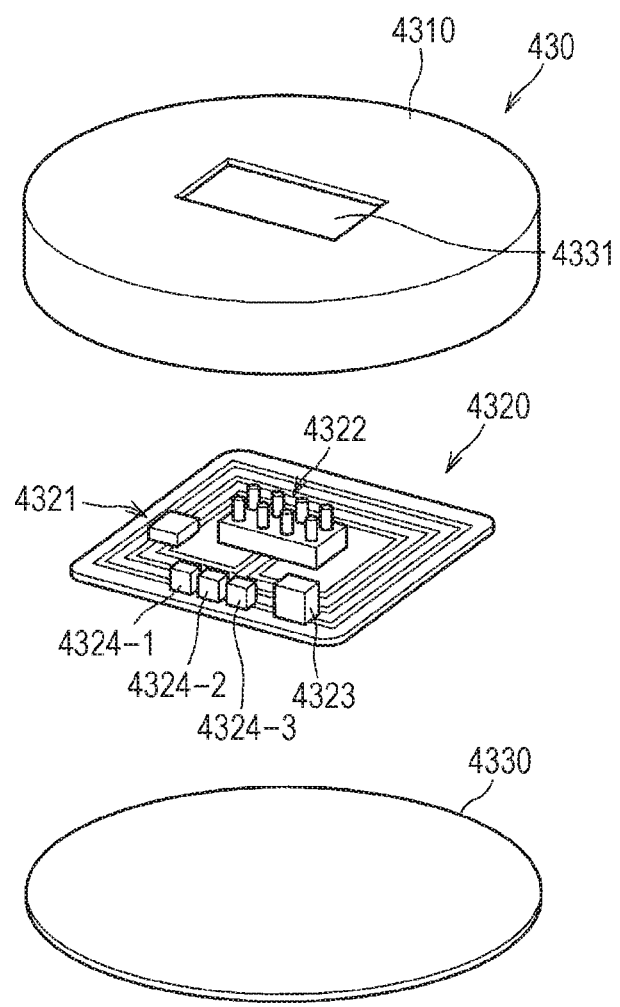
FIG. 7 is an exploded perspective view of an extended pedestal.

FIG. 7 is an exploded perspective view of the extended pedestal 430. As illustrated in FIG. 7, the extended pedestal 430 includes an upper lid 4310, a lower lid 4330, and a substrate 4320. The substrate 4320 can be held in a space that is generated inside the upper lid 4310 and the lower lid 4330 when the upper lid 4310 and the lower lid 4330 are fitted.

A second connection portion (hereinafter, also referred to as "basic pedestal connection portion") 4322 to be connected to the basic pedestal 420 is formed on an upper surface of the substrate 4320. A hole 4331 is formed in the upper lid 4310. The basic pedestal connection portion 4322 passes through the hole 4331 when the basic pedestal connection portion 4322 is connected to the basic pedestal 420.

In addition, a micro controller unit (MCU) 4321 is formed on the upper surface of the substrate 4320 as an example of a control device. Further, LEDs 4324-1 to 4324-3 are formed on the upper surface of the substrate 4320. In the example illustrated in FIG. 7, the number of LEDs 4324 is three, but the number of LEDs 4324 is not limited to three. Further, the switch 4323 is formed on the upper surface of the substrate 4320.

Figure 8:
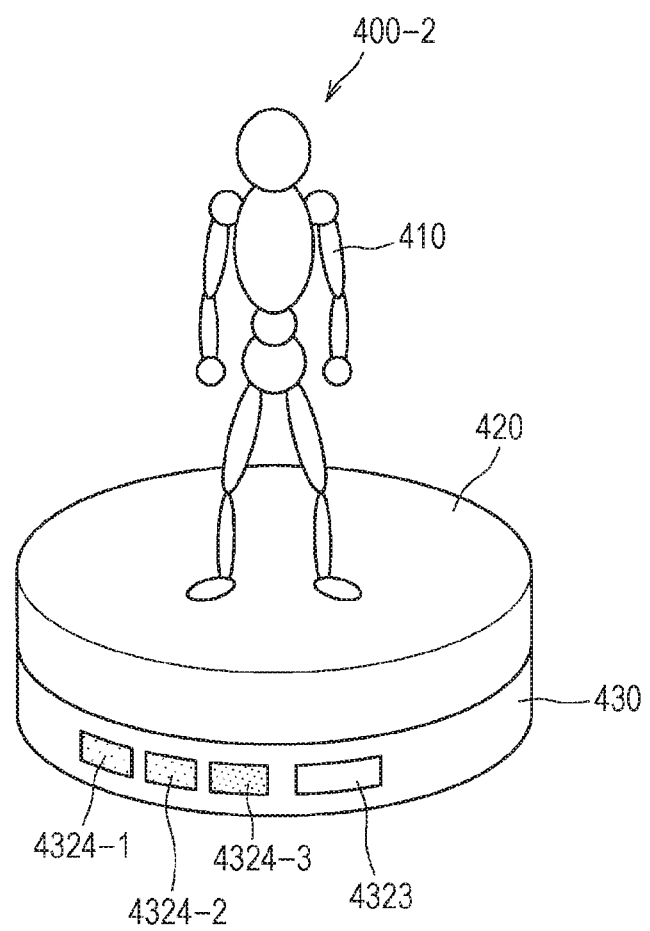
FIG. 8 is an exploded perspective view of a game device including a basic pedestal and an extended pedestal.

FIG. 8 is an exploded perspective view of the game device 400-2 including the basic pedestal 420 and the extended pedestal 430. As illustrated in FIG. 8, when the basic pedestal 420 and the extended pedestal 430 are connected to each other, the combined state between the basic pedestal 420 and the extended pedestal 430 can be formed, and the user can integrally use the basic pedestal 420 and the extended pedestal 430. The switch 4323 can be operated by the user. Further, the LEDs 4324-1 to 4324-3 can be turned on to be visually recognized by the user.

The structure of the game device 400 has been described above.

1.4. Usefulness of Separating Game Device

Figure 9:
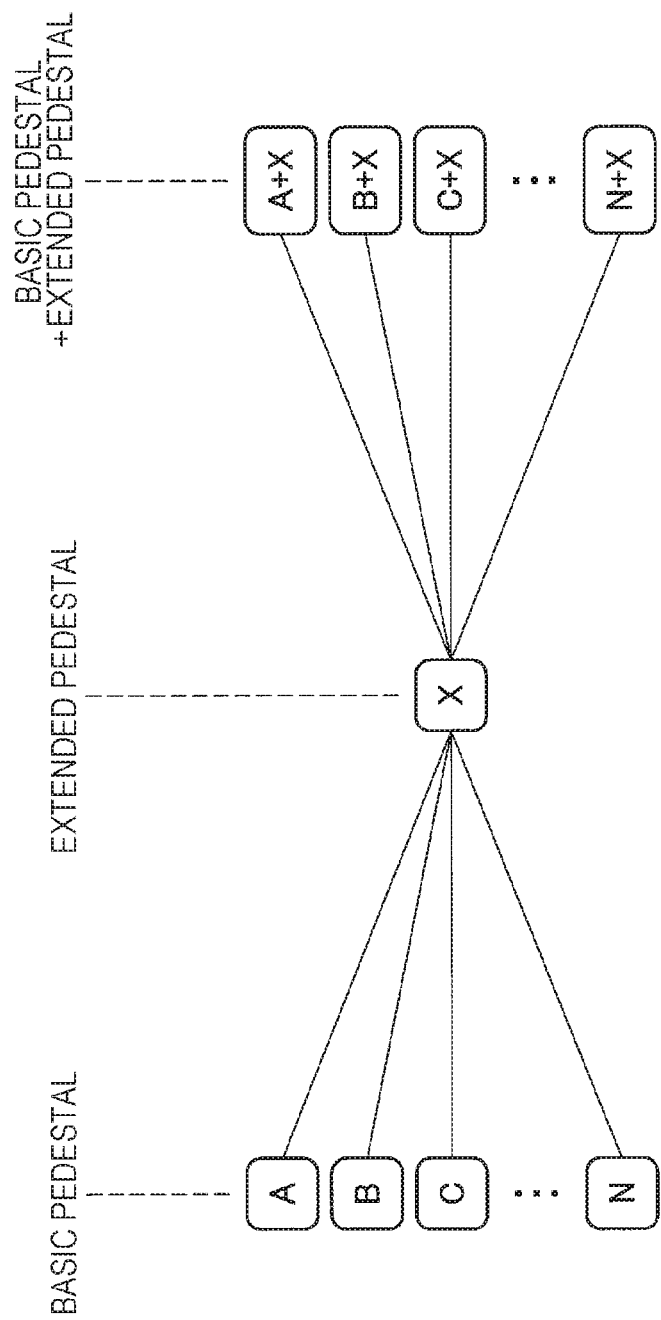
FIG. 9 is a diagram for describing usefulness of separating a game device into a basic pedestal and an extended pedestal.

Next, the usefulness of separating the game device 400 into the basic pedestal 420 and the extended pedestal 430 will be described. FIG. 9 is a diagram for describing the usefulness of separating the game device 400 into the basic pedestal 420 and the extended pedestal 430. Referring to FIG. 9, the kinds of basic pedestals 420 are represented as "A" to "N". That is, the kinds of game devices 400 that can be used for the game in the state of the single basic pedestal are "A" to "N".

Meanwhile, the kind of extended pedestal 430 is represented as "X". At this time, the kinds of combined states between the basic pedestal 420 and the extended pedestal 430 are represented as "A+X" to "N+X". That is, the kinds of game devices 400 that can be used for the game in the combined state between the basic pedestal and the extended pedestal are "A+X" to "N+X".

As described above, the game device 400 is separated into the basic pedestal 420 and the extended pedestal 430. Thus, in a case where there is a plurality of kinds of basic pedestals 420, the same number of combined states between the basic pedestal 420 and the extended pedestal 430 as the number of kinds of basic pedestals 420 can also be created, even if there is only one kind of extended pedestal 430. For example, even if there is only one kind of extended pedestal 430, it is possible to perform UI expression unique to the FIG. 410 in the combined state between the basic pedestal 420 and the extended pedestal 430 as well as in the state of the single basic pedestal. Further, because only one kind of extended pedestal 430 is required, it is possible to reduce a cost for creating the game device.

Note that, in the example illustrated in FIG. 9, there is only one kind of extended pedestal 430. However, there may be a plurality of kinds of extended pedestals 430. For example, the kind of extended pedestal 430 may be changed in accordance with a predetermined condition. For example, the kind of extended pedestal 430 may be changed in accordance with a current time, or may be changed in accordance with the identification information read from the memory of the basic pedestal 420.

The usefulness of separating the game device 400 into the basic pedestal 420 and the extended pedestal 430 has been described above.

1.5. Functional Configuration Example of Game Device

Figure 10:
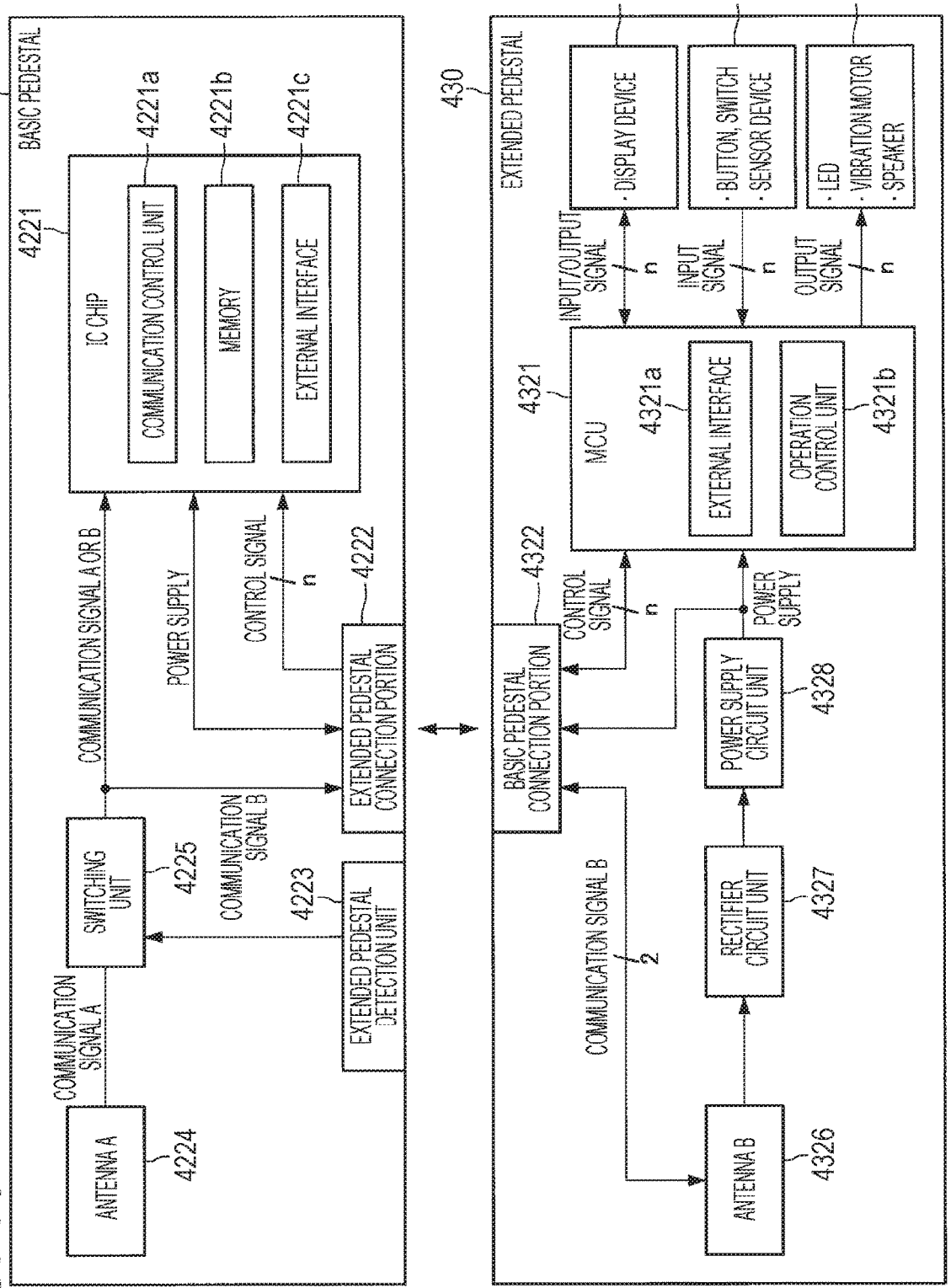
FIG. 10 illustrates a functional configuration example of a game device.

Next, a functional configuration example of the game device 400 will be described. FIG. 10 illustrates a functional configuration example of the game device 400. FIG. 10 illustrates the basic pedestal 420 and the extended pedestal 430.

The basic pedestal 420 includes an antenna A (first antenna) (4224), an extended pedestal detection unit 4223, a switching unit 4225, the extended pedestal connection portion 4222, and the IC chip 4221. The IC chip 4221 includes a communication control unit 4221a, a memory 4221b, and an external interface 4221c. As described above, the identification information and the individual information are recorded on the memory 4221b.

The external interface 4221c transmits/receives control signals to/from an external interface 4321a of the MCU 4321 of the extended pedestal 430 via the extended pedestal connection portion 4222 and the basic pedestal connection portion 4322, thereby realizing communication between the IC chip 4221 of the basic pedestal 420 and the MCU 4321 of the extended pedestal 430.

Meanwhile, the extended pedestal 430 includes an antenna B (second antenna) (4326), the basic pedestal connection portion 4322, a rectifier circuit unit 4327, a power supply circuit unit 4328, the MCU 4321, and a UI (FIG. 10. The MCU 4321 includes the external interface 4321a and an operation control unit 4321b.

The external interface 4321c transmits/receives control signals to/from the external interface 4221c of the MCU 4321 of the extended pedestal 430 via the basic pedestal connection portion 4322 and the extended pedestal connection portion 4222, thereby realizing communication between the MCU 4321 of the extended pedestal 430 and the IC chip 4221 of the basic pedestal 420.

The example in FIG. 10 illustrates an input/output unit 4325, an input unit 4323Z, and an output unit 4324Z as examples of the UI. The input/output unit 4325 includes a display device equipped with a touchscreen. The input unit 4323Z includes a button, a switch, and a sensor device. The output unit 4324Z includes an LED, a vibration motor, and a speaker. In this embodiment, the extended pedestal 430 is mainly assumed to include a switch and an LED as examples of the UI.

The antenna A (4224) can perform wireless communication with the reader/writer of the pad device 300. For example, the antenna A (4224) can perform short-range wireless communication based on the predetermined standard with the reader/writer of the pad device 300. Similarly, the antenna B (4326) can perform wireless communication with the reader/writer of the pad device 300. For example, the antenna B (4226) can perform short-range wireless communication based on the predetermined standard with the reader/writer of the pad device 300.

The extended pedestal connection portion 4222 of the basic pedestal 420 and the basic pedestal connection portion 4322 of the extended pedestal 430 are connected and disconnected on the basis of user operation. In a case where the extended pedestal 430 is not connected to the basic pedestal 420, the game device 400 is in the state of the single basic pedestal. Meanwhile, in a case where the extended pedestal 430 is connected to the basic pedestal 420, the game device 400 is in the combined state between the basic pedestal and the extended pedestal.

The communication control unit 4221a can control wireless communication with the reader/writer of the pad device 300 using the antenna A (4224). In particular, in a case where the extended pedestal 430 is not connected to the basic pedestal 420 (i.e., in a case where the game device 400 is in the state of the single basic pedestal), the communication control unit 4221a controls wireless communication with the reader/writer of the pad device 300 using the antenna A (4224).

Further, the communication control unit 4221a can control wireless communication with the reader/writer of the pad device 300 using the antenna B (second antenna) (4326) of the extended pedestal 430 via the extended pedestal connection portion 4222 and the basic pedestal connection portion 4322. In particular, in a case where the extended pedestal 430 is connected to the basic pedestal 420 (i.e., in a case where the game device 400 is in the combined state between the basic pedestal and the extended pedestal), the communication control unit 4221a controls wireless communication with the reader/writer of the pad device 300 using the antenna B (4326).

As described above, in a case where the antenna whose wireless communication is controlled is changed depending on whether or not the extended pedestal 430 is connected to the basic pedestal 420, a collision may occur between wireless communication using the antenna A (4224) of the basic pedestal 420 and wireless communication using the antenna B (4326) of the extended pedestal 430. Therefore, it is preferable to take a countermeasure against the collision between the wireless communication using the antenna A (4224) of the basic pedestal 420 and the wireless communication using the antenna B (4326) of the extended pedestal 430.

Figure 11:
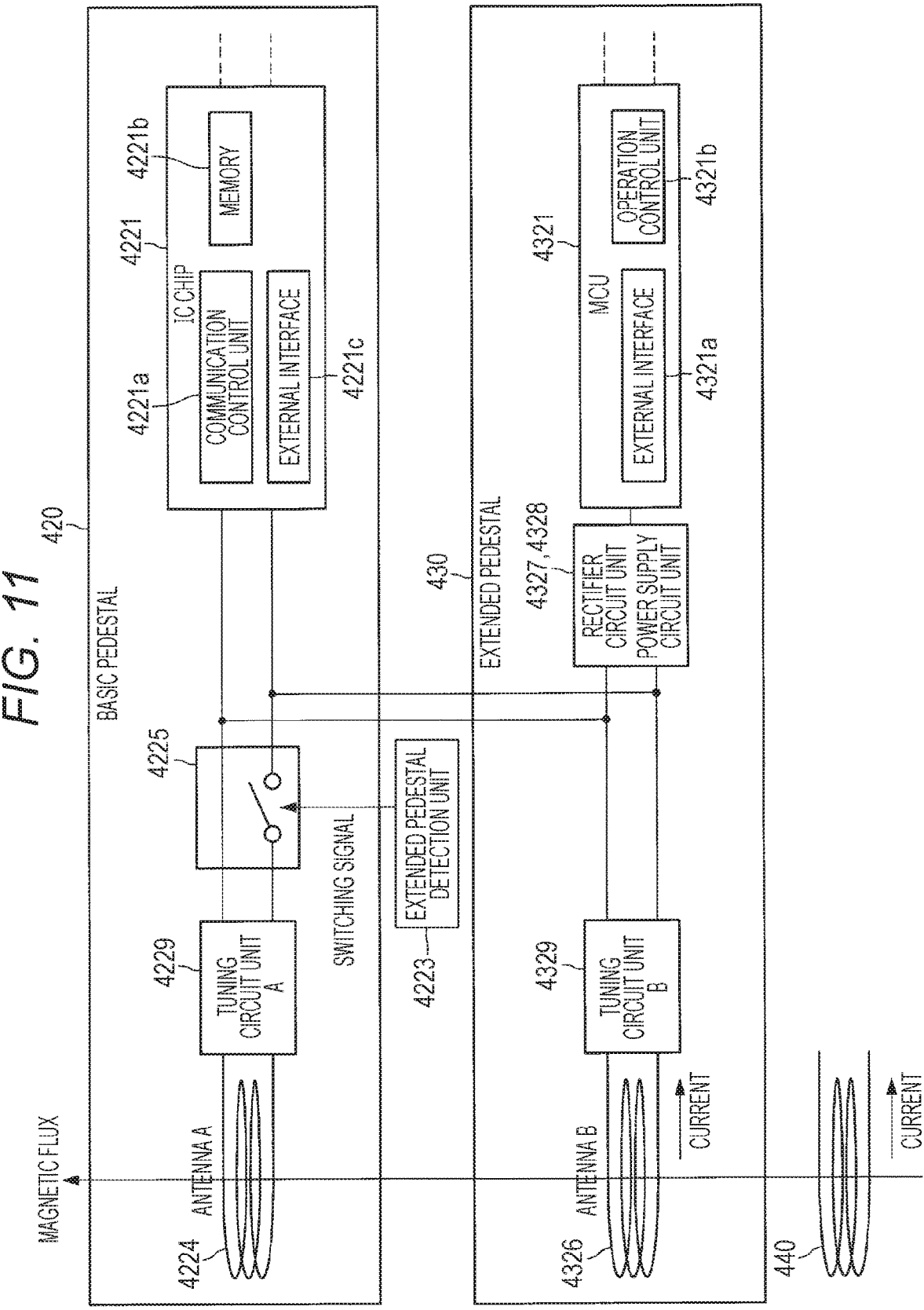
FIG. 11 is a diagram for describing an example of a countermeasure against a collision between wireless communications.

Herein, an example in which a countermeasure against the collision between the wireless communications is taken by the extended pedestal detection unit 4223 and the switching unit 4225 will be described. FIG. 11 is a diagram for describing an example of the countermeasure against the collision between the wireless communications. Note that Modification Examples 1 and 2 of the countermeasure against the collision between the wireless communications will be described below.

As illustrated in FIG. 11, the basic pedestal 420 includes not only the antenna A (4224), the extended pedestal detection unit 4223, the switching unit 4225, and the IC chip 4221, but also a tuning circuit unit A (4229). Further, the extended pedestal 430 includes not only the antenna B (4326), the rectifier circuit unit 4327, the power supply circuit unit 4328, and the MCU 4321 but also a tuning circuit unit B (4329). FIG. 11 also illustrates an antenna (hereinafter, also referred to as "pad antenna") 440 included in the pad device 300.

The extended pedestal detection unit 4223 detects a connection state between the extended pedestal connection portion 4222 and the basic pedestal connection portion 4322. Herein, it is mainly assumed that the extended pedestal detection unit 4223 directly checks whether or not the extended pedestal connection portion 4222 and the basic pedestal connection portion 4322 are connected. However, the extended pedestal detection unit 4223 may detect the connection state in any way. For example, the extended pedestal detection unit 4223 may detect the connection state by using a predetermined switch, or may detect the connection state by using a control signal transmitted from the MCU 4321.

The switching unit 4225 switches the antenna whose wireless communication is controlled by the communication control unit 4221$a$ between the antenna A (4224) and the antenna B (4326) on the basis of the connection state between the extended pedestal connection portion 4222 and the basic pedestal connection portion 4322.

For example, in a case where the extended pedestal detection unit 4223 detects connection between the extended pedestal connection portion 4222 and the basic pedestal connection portion 4322, the switching unit 4225 only needs to switch the antenna whose wireless communication is controlled by the communication control unit 4221$a$ from the antenna A (4224) to the antenna B (4326). Specifically, as illustrated in FIG. 11, when the switch of the switching unit 4225 is turned off, the antenna whose wireless communication is controlled by the communication control unit 4221$a$ can be switched from the antenna A (4224) to the antenna B (4326).

Meanwhile, in a case where disconnection between the extended pedestal connection portion 4222 and the basic pedestal connection portion 4322 is detected, the switching unit 4225 only needs to switch the antenna whose wireless communication is controlled by the communication control unit 4221$a$ from the antenna B (4326) to the antenna A (4224). Specifically, when the switch of the switching unit 4225 is turned on, the antenna whose wireless communication is controlled by the communication control unit 4221$a$ from the antenna B (4326) to the antenna A (4224).

Referring back to FIG. 10, description will be continued. The communication control unit 4221$a$ controls reading of the identification information from the memory 4221$b$ on the basis of wireless communication with the reader/writer of the pad device 300 via the antenna A (4224) or antenna B (4326).

For example, in a case where the extended pedestal 430 is not connected to the basic pedestal 420 (i.e., in a case where the game device 400 is in the state of the single basic pedestal), it is assumed that the antenna A (4224) receives a read request from the reader/writer of the pad device 300 under the control of the game console main body 200. In such a case, the communication control unit 4221$a$ only needs to read the identification information from the memory 4221$b$ and control the antenna A (4224) so that the antenna A (4224) returns a read response including the identification information to the reader/writer of the pad device 300.

Meanwhile, in a case where the extended pedestal 430 is connected to the basic pedestal 420 (i.e., in a case where the game device 400 is in the combined state between the basic pedestal and the extended pedestal), it is assumed that the antenna B (4326) receives a read request from the reader/writer of the pad device 300 under the control of the game console main body 200. In such a case, the communication control unit 4221$a$ only needs to read the identification information from the memory 4221$b$ and control the antenna B (4226) so that the antenna B (4326) returns a read response including the identification information to the reader/writer of the pad device 300.

In a case where the antenna B (4326) receives a UI operation request from the reader/writer of the pad device 300, the operation control unit 4321$b$ controls the LED so as to turn on the LED on the basis of the UI operation request. At this time, the LED lighting pattern may be recorded on the memory 4221$b$ of the basic pedestal 420 in advance, or may be included in the UI operation request.

First, the LED lighting pattern is assumed to be recorded on the memory 4221$b$ of the basic pedestal 420 in advance. In such a case, in a case where the antenna B (4326) receives a UI operation request from the reader/writer of the pad device 300, the operation control unit 4321$b$ only needs to read the LED lighting pattern corresponding to the UI operation request from the memory 4221$b$ of the basic pedestal 420 and control the LED so as to turn on the LED on the basis of the LED lighting pattern.

Meanwhile, the LED lighting pattern is assumed to be included in the UI operation request. In such a case, in a case where the antenna B (4326) receives a UI operation request from the reader/writer of the pad device 300, the operation control unit 4321$b$ only needs to acquire the LED lighting pattern from the UI operation request and control the LED so as to turn on the LED on the basis of the LED lighting pattern.

Further, the extended pedestal 430 includes the switch. The switch can accept operating information from the user. More specifically, the switch of the extended pedestal 430 can accept operating information (on or off) from the user. At this time, in a case where the antenna B (4326) receives an operating information request (state check request) from the reader/writer of the pad device 300, the antenna B (4326) transmits operating information to the reader/writer of the pad device 300 under the control of the game console main body 200.

The power supply circuit unit 4328 generates power supply on the basis of a magnetic field detected by the antenna B (4326). Specifically, when the antenna B (4326) outputs an alternating current generated on the basis of the magnetic field to the rectifier circuit unit 4327, the rectifier circuit unit 4327 converts the alternating current into a direct current and outputs the direct current to the power supply circuit unit 4328. The power supply circuit unit 4328 acquires power from such a direct current and supplies the power to the IC chip 4221 and the MCU 4321.

Thus, in a case where power is acquired on the basis of the magnetic field detected by the antenna B (4326), a battery for charging is unnecessary. Therefore, the extended pedestal 430 can be reduced in thickness, size, or cost.

Note that FIG. 10 illustrates a case where power is generated by the power supply circuit unit 4328. However, the extended pedestal 430 may include a battery. At this time, power from the battery may be supplied to the IC chip 4221 and the MCU 4321. Thus, in a case where power is supplied from the battery, it is unnecessary to detect a magnetic field for charging. Therefore, the game device can operate more dynamically and even in a state away from a power supply source. The kind of battery may be a primary battery or a secondary battery.

The functional configuration example of the game device 400 has been described above.

Figure 12:
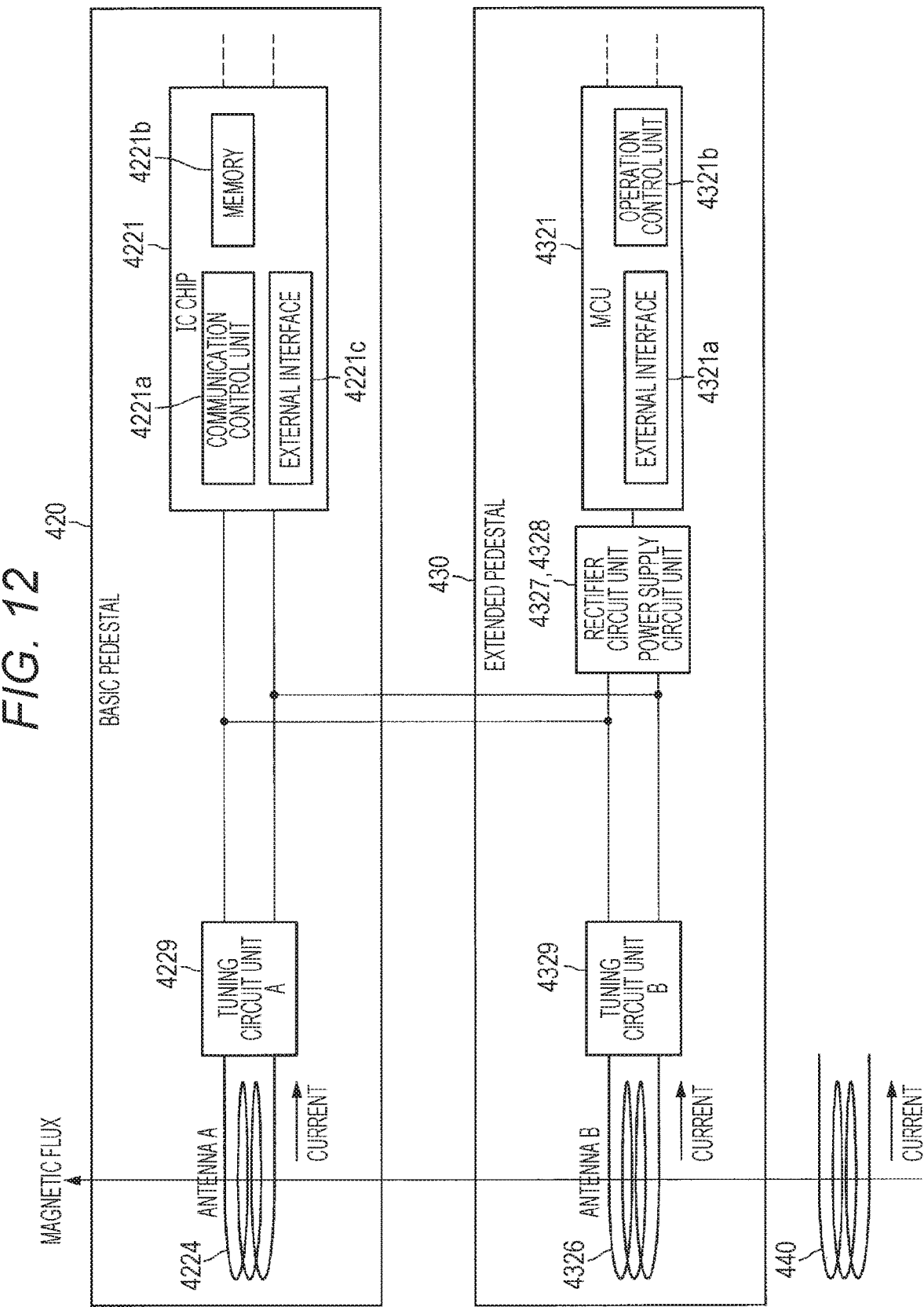
FIG. 12 is a diagram for describing Modification Example 1 of a countermeasure against a collision between wireless communications.

1.6. Modification Examples of Countermeasure Against Collision Between Wireless Communications Next, modification examples of the countermeasure against the collision between the wireless communication using the antenna A (4224) of the basic pedestal 420 and the wireless communication using the antenna B (4326) of the extended pedestal 430 will be described. First, Modification Example 1 of the countermeasure against the collision between the wireless communications will be described. FIG. 12 is a diagram for describing Modification Example 1 of the countermeasure against the collision between the wireless communications.

As illustrated in FIG. 12, the basic pedestal 420 includes not only the antenna A (4224) and the IC chip 4221 but also the tuning circuit unit A (4229). That is, unlike the example illustrated in FIG. 11, the basic pedestal 420 does not need to include the extended pedestal detection unit 4223 or the switching unit 4225. Further, the extended pedestal 430 includes not only the antenna B (4326), the rectifier circuit unit 4327, the power supply circuit unit 4328, and the MCU 4321 but also a tuning circuit unit B (4329). FIG. 12 also illustrates the pad antenna 440 included in the pad device 300.

As illustrated in FIG. 12, as Modification Example 1 of the countermeasure against the collision between the wireless communication using the antenna A (4224) of the basic pedestal 420 and the wireless communication using the antenna B (4326) of the extended pedestal 430, the antenna A (4224) may be connected in parallel with the antenna B (4326). With this configuration, the antenna A (4224) and the antenna B (4326) can be integrally treated. This makes it possible to avoid the collision between the wireless communications.

Figure 13:
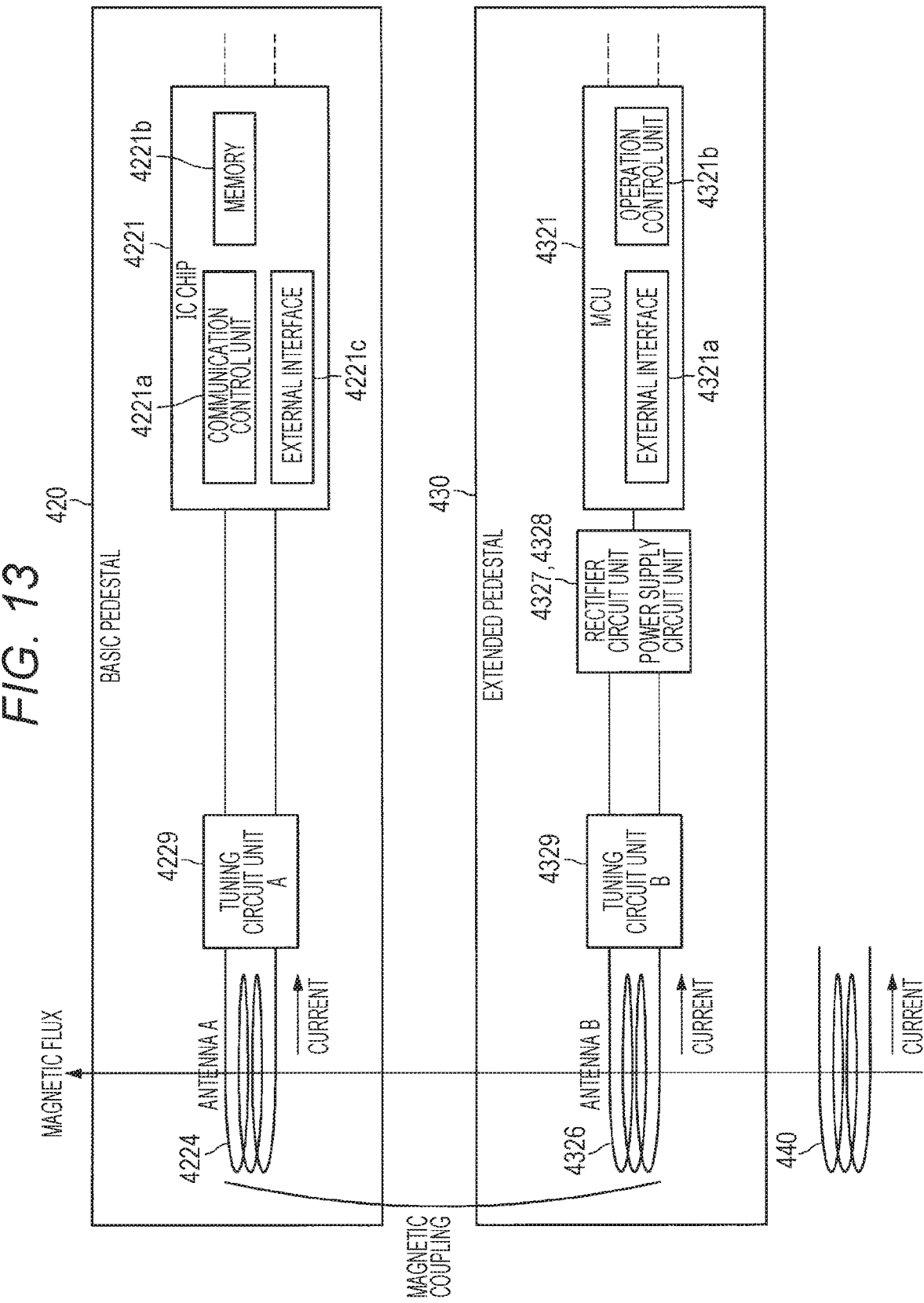
FIG. 13 is a diagram for describing Modification Example 2 of a countermeasure against a collision between wireless communications.

Next, Modification Example 2 of the countermeasure against the collision between the wireless communications will be described. FIG. 13 is a diagram for describing Modification Example 2 of the countermeasure against the collision between the wireless communications.

As illustrated in FIG. 13, the basic pedestal 420 includes not only the antenna A (4224) and the IC chip 4221 but also the tuning circuit unit A (4229). That is, unlike the example illustrated in FIG. 11, the basic pedestal 420 does not need to include the extended pedestal detection unit 4223 or the switching unit 4225. Further, the extended pedestal 430 includes not only the antenna B (4326), the rectifier circuit unit 4327, the power supply circuit unit 4328, and the MCU 4321 but also a tuning circuit unit B (4329). FIG. 12 also illustrates the pad antenna 440 included in the pad device 300.

As illustrated in FIG. 13, as Modification Example 2 of the countermeasure against the collision between the wireless communication using the antenna A (4224) of the basic pedestal 420 and the wireless communication using the antenna B (4326) of the extended pedestal 430, the antenna A (4224) may be magnetically coupled (magnetic-field coupled) to the antenna B (4326). With this configuration, the antenna A (4224) and the antenna B (4326) can be integrally treated. This makes it possible to avoid the collision between the wireless communications.

Modification examples of the countermeasure against the collision between the wireless communications have been described below.

1.7. Operation Examples

Next, operation of the information processing system according to the embodiment of the present disclosure will be specifically described with reference to FIGS. 14 to 16. First, operation in which lighting of the LED in the game device 400 is executed on the basis of the LED lighting pattern read from the memory 4221*b* of the basic pedestal 420 will be described with reference to FIG. 14.

Figure 14:
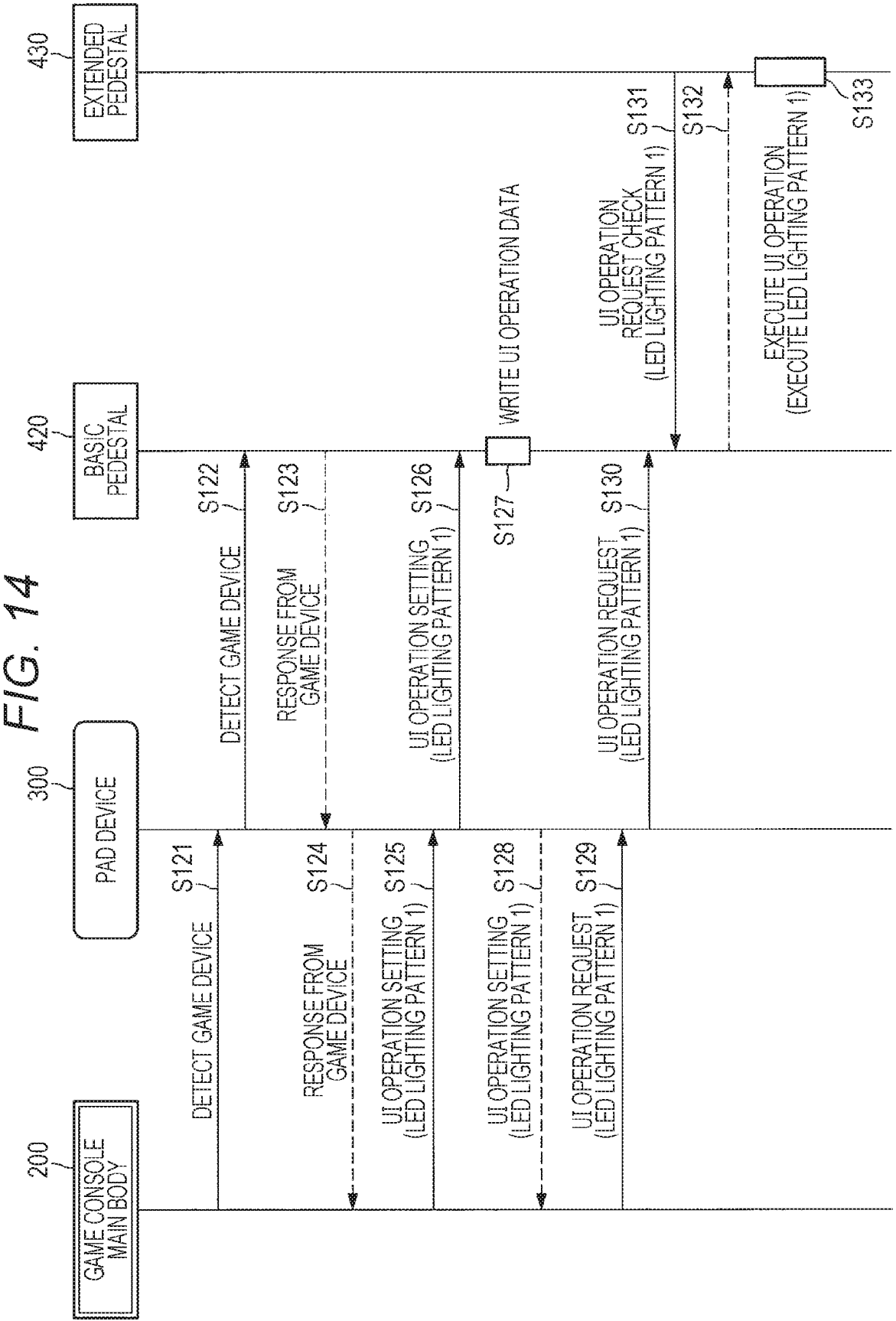
FIG. 14 is a flowchart showing operation in which lighting of an LED in a game device is executed on the basis of an LED lighting pattern read from a memory of a basic pedestal.

FIG. 14 is a flowchart showing operation in which lighting of the LED in the game device 400 is executed on the basis of the LED lighting pattern read from the memory 4221*b* of the basic pedestal 420. As shown in FIG. 14, the game console main body 200 transmits an instruction to detect a game device to the pad device 300 at a predetermined timing during progress of a game (S121). Upon receipt of the instruction to detect the game device, the pad device 300 attempts to detect whether or not the game device is detected by transmitting a read request via short-range wireless communication (S122).

Herein, it is assumed that the extended pedestal 430 is not connected to the basic pedestal 420 (i.e., the game device 400 is in the state of the single basic pedestal). In such a case, the basic pedestal 420 receives the read request via the antenna A (4224). When the read request is received, the communication control unit 4221*a* reads identification information and individual information from the memory 4221*b*, and includes the identification information and individual information in a response to the read request. The antenna A (4224) transmits the response to the game console main body 200 via the pad device 300 (S123, S124).

As described above, the identification information may be information for identifying the FIG. 410. At this time, the game console main body 200 can identify the FIG. 410 formed on the basic pedestal 420 on the basis of the identification information. Further, as described above, the individual information may be information indicating the characteristics of the character corresponding to the FIG. 410 (e.g., the strength and the like of the character). At this time, the individual information can be used for the progress of the game.

Then, the game console main body 200 transmits a UI operation setting instruction including an LED lighting pattern to the pad device 300 (S125). Such an LED lighting pattern may be determined by the game console main body 200 in accordance with the identification information or in accordance with both the identification information and the individual information. Upon receipt of the UI operation setting instruction, the pad device 300 controls a UI operation setting by transmitting a UI setting request including the LED lighting pattern via short-range wireless communication (S126).

Herein, it is assumed that the extended pedestal 430 is not connected to the basic pedestal 420 (i.e., the game device 400 is in the state of the single basic pedestal). In such a case, the basic pedestal 420 receives the UI setting request via the antenna A (4224). When the UI setting request is received, the communication control unit 4221*a* acquires the LED lighting pattern from the UI setting request and writes the LED lighting pattern into the memory 4221*b* (S127). The pad device 300 transmits the control result of the UI operation setting to the game console main body 200 (S128).

Then, the game console main body 200 transmits a UI operation instruction including information that specifies the LED lighting pattern to the pad device 300 at a predetermined timing during the progress of the game (S129). Upon receipt of the UI operation instruction, the pad device 300 controls UI operation by transmitting a UI operation request including the information that specifies the LED lighting pattern via short-range wireless communication (S130).

Herein, it is assumed that the extended pedestal 430 is connected to the basic pedestal 420 (i.e., the game device 400 is in the combined state between the basic pedestal and the extended pedestal). In such a case, the extended pedestal 430 receives the UI operation request via the antenna B (4326). When the UI operation request is received, the operation control unit 4321b acquires the information that specifies the LED lighting pattern from the UI operation request, and reads the LED lighting pattern specified by the information from the memory 4221b (S131, S132). The operation control unit 4321b turns on the LED on the basis of the LED lighting pattern (S133).

The operation in which lighting of the LED in the game device 400 is executed on the basis of the LED lighting pattern read from the memory 4221b of the basic pedestal 420 has been described above.

Next, operation in which lighting of the LED in the game device 400 is executed on the basis of an LED lighting pattern that is acquired in response to a UI operation instruction from the game console main body 200 will be described with reference to FIG. 15.

Figure 15:
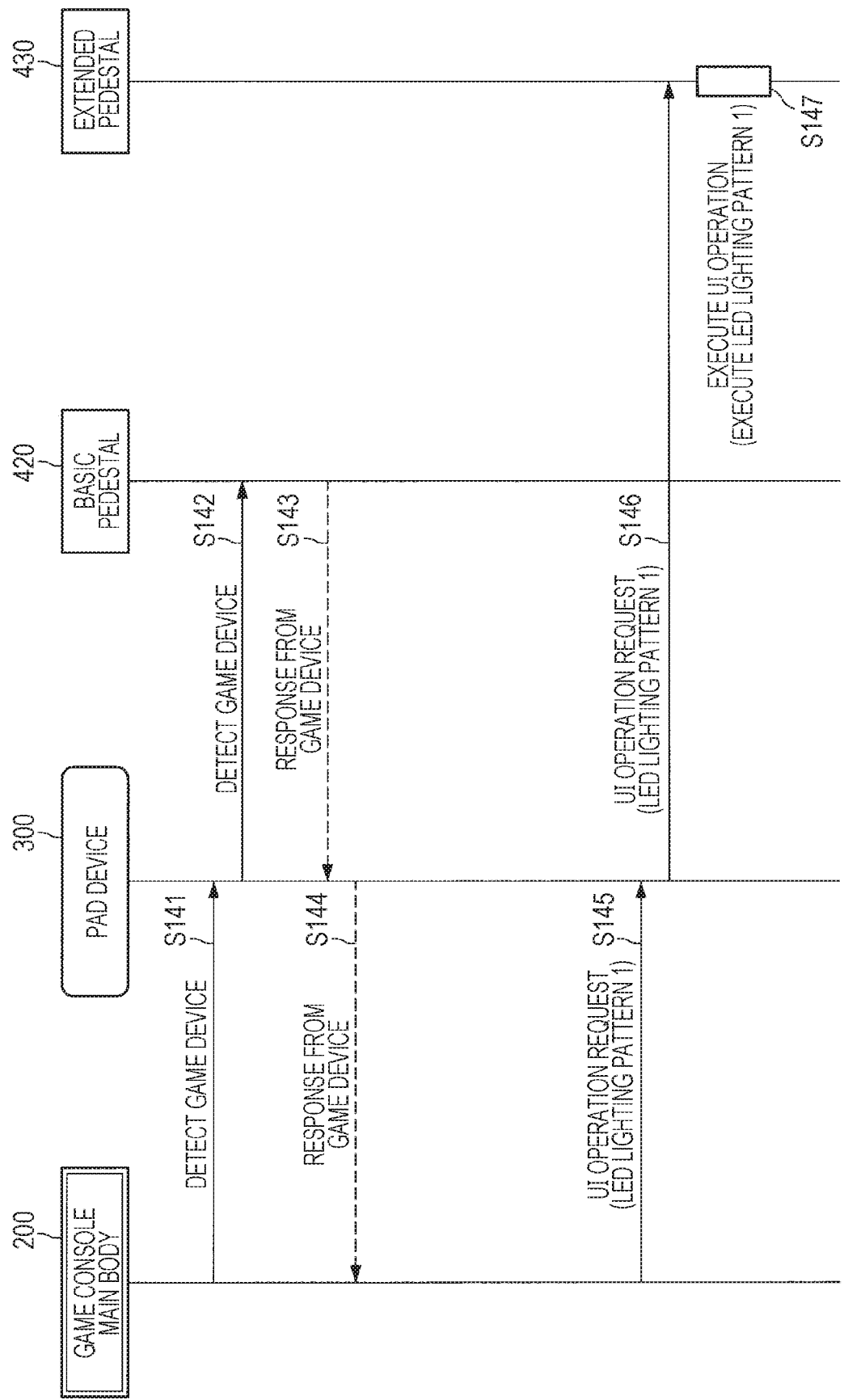
FIG. 15 is a flowchart showing operation in which lighting of an LED in a game device is executed on the basis of an LED lighting pattern that is acquired in response to a UI operation instruction from a game console main body.

FIG. 15 is a flowchart showing operation in which lighting of the LED in game device 400 is executed on the basis of an LED lighting pattern that is acquired in response to a UI operation instruction from the game console main body 200. As shown in FIG. 15, first, S141 to S144 are executed. Such S141 to S144 may be executed in a similar manner to S121 to S124 shown in FIG. 14. Therefore, detailed description of S141 to S144 shown in FIG. 15 will be omitted.

Then, the game console main body 200 transmits a UI operation instruction including an LED lighting pattern to the pad device 300 at a predetermined timing during the progress of the game (S145). Upon receipt of the UI operation instruction, the pad device 300 controls UI operation by transmitting a UI operation request including the LED lighting pattern via short-range wireless communication (S146).

Herein, it is assumed that the extended pedestal 430 is connected to the basic pedestal 420 (i.e., the game device 400 is in the combined state between the basic pedestal and the extended pedestal). In such a case, the extended pedestal 430 receives the UI operation request via the antenna B (4326). When the UI operation request is received, the operation control unit 4321b acquires the LED lighting pattern from the UI operation request and turns on the LED on the basis of the LED lighting pattern (S147).

The operation in which lighting of the LED is executed on the basis of the LED lighting pattern that is acquired in response to the UI operation instruction from the game console main body 200 has been described above.

Next, operation of notifying the game console main body 200 of information regarding user operation on the game device 400 will be described with reference to FIG. 16.

Figure 16:
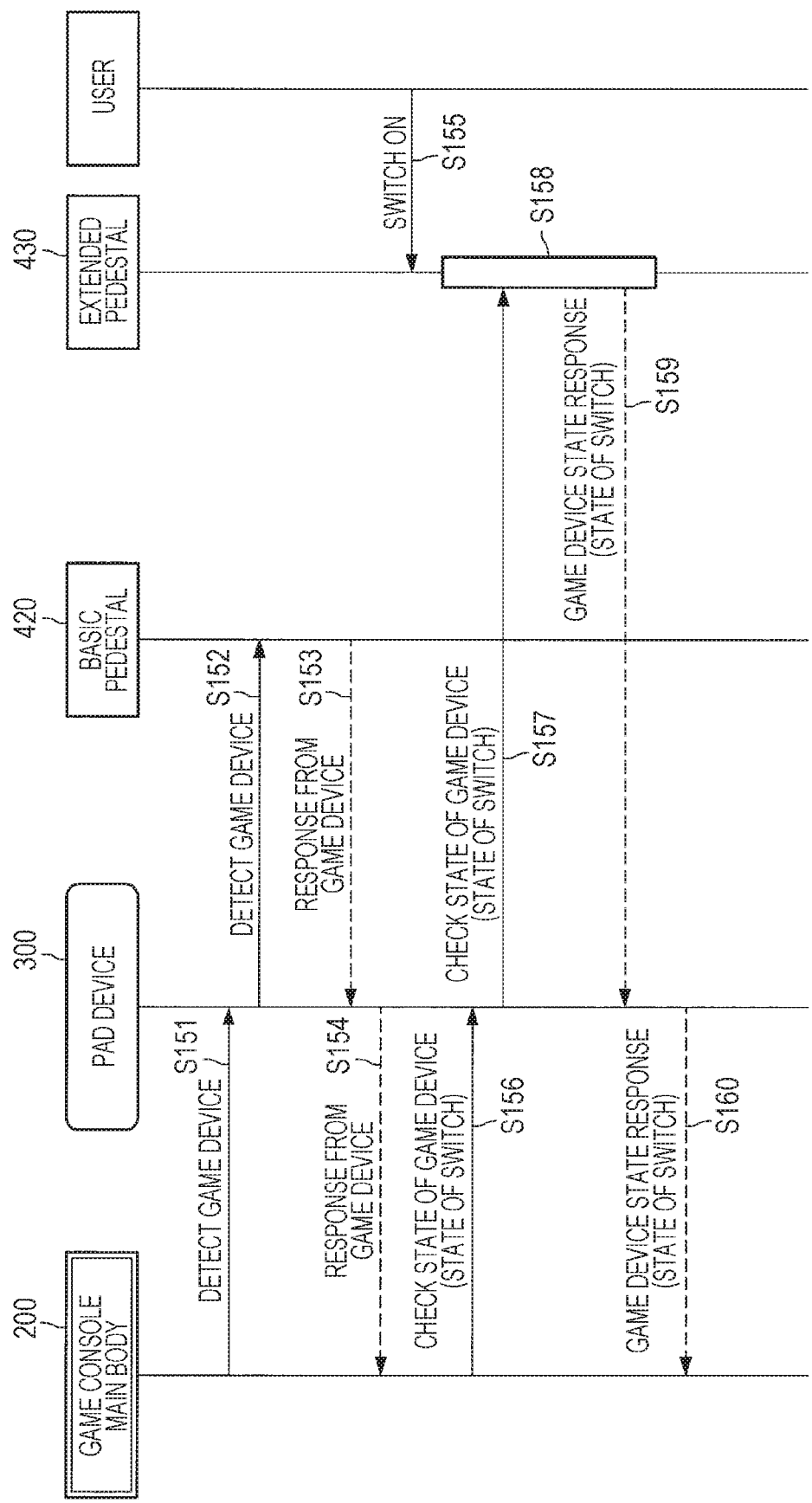
FIG. 16 is a flowchart showing operation in which lighting of an LED in a game device is executed on the basis of an LED lighting pattern acquired in response to a UI operation instruction from a game console main body.

FIG. 16 is a flowchart showing operation of notifying the game console main body 200 of information regarding user operation on the game device 400. As shown in FIG. 16, first, S151 to S154 are executed. Such S151 to S154 may be executed in a similar manner to S121 to S124 shown in FIG. 14. Therefore, detailed description of S151 to S154 shown in FIG. 16 will be omitted. Herein, the user turns on the switch of the extended pedestal 430 (S155).

Then, the game console main body 200 transmits an instruction to check a state of the game device to the pad device 300 at a predetermined timing during the progress of the game (S156). Upon receipt of the instruction to check the state of the game device, the pad device 300 checks the state of the game device by transmitting a state check request via short-range wireless communication (S157).

Herein, it is assumed that the extended pedestal 430 is connected to the basic pedestal 420 (i.e., the game device 400 is in the combined state between the basic pedestal and the extended pedestal). In such a case, the extended pedestal 430 receives the state check request via the antenna B (4326). When the state check request is received, the operation control unit 4321b acquires a state of the switch (e.g., whether the switch is on or off) (S158), and the antenna B (4326) returns a state check response including the state of the switch to the game console main body 200 via the pad device 300 (S159, S160)

In this way, the game console main body 200 is notified of information regarding user operation on the game device 400. In the game console main body 200, the information regarding the user operation transmitted as described above may be used in any way. For example, in the game console main body 200, the information regarding the user operation may be used for the progress of the game. For example, in a case where the game console main body 200 detects turning on of the switch of the game device 400, it may be determined that the character corresponding to the FIG. 410 of the game device 400 has attacked.

The operation of notifying the game console main body 200 of information regarding user operation on the game device 400 has been described above.

2. CONCLUSION

As described above, in this embodiment, a game device having a UI improves the game characteristics and enhances the user experience. For example, there is provided a game device capable of performing interactive UI expression in accordance with predetermined processing because a user interface and a processor for controlling the user interface are mounted on the game device.

With such a game device, expression according to execution of the game can be given by the game device, in addition to a normal decoration for the game device (figure). As an example, expression (e.g., lighting of the LED, and the like) that matches a timing at which a character appearing in the game shows a technique can be given by the game device.

Further, according to this embodiment, the game console main body and the game device can realize wireless communication via the pad device in response to a command from the game console main body. Thus, various expressions can be achieved by cooperatively performing the game console main body and the game device. As an example, it is possible to transmit information regarding the figure from the game console main body to the user and transmit user operation regarding the figure to the game console main body. With this configuration, it is expected that an interactive UI is realized and possibilities of the game are expanded.

The preferred embodiments of the present disclosure have been described above in detail with reference to the accompanying drawings. However, the present technology is not limited to such examples. It is obvious that a person having ordinary knowledge in the technical field of the present disclosure can come up with various changes or modifications within the scope of the technical idea described in the claims. As a matter of course, it is understood that those changes and modifications also belong to the technical scope of the present disclosure.

For example, a computer program for exercising functions of the game console main body 200, the pad device 300, or the game device 400 described above can also be created in hardware such as a CPU (or MCU), a ROM, a RAM, and an IC chip included the game console main body 200, the pad device 300, or the game device 400. Further, a computer-readable storage medium storing the computer program is also provided.

Further, the effects described in the present specification are merely illustrative or exemplary and are not limited. In other words, the technology according to the present disclosure can have other effects that are apparent to those skilled in the art from the description of the present specification in addition to or in place of the above effects.

Note that the present technology can also be configured as follows.

(1)

A first information processing device including:

a first connection portion that is connected to a second information processing device;

a first antenna configured to perform wireless communication with an external device; and a communication control unit configured to control wireless communication with the external device via the first antenna and control wireless communication with the external device via a second antenna of the second information processing device through the first connection portion, in which the first information processing device is engageable with the second information processing device, and the communication control unit controls reading of identification information from a memory on the basis of wireless communication with the external device via the first antenna or the second antenna.

(2)

The first information processing device according to (1), in which the identification information is related to a figure formed on the first information processing device.

(3)

The first information processing device according to (1) or (2), in which in a case where the first antenna receives operation information from the external device, the communication control unit writes the operation information into the memory.

(4)

The first information processing device according to any one of (1) to (3), further including:

a detection unit configured to detect a connection state between the first connection portion and the second information processing device; and a switching unit configured to switch, on the basis of the connection state, an antenna whose wireless communication is controlled by the communication control unit between the first antenna and the second antenna.

(5)

The first information processing device according to (4), in which in a case where connection between the first connection portion and the second information processing device is detected, the switching unit switches the antenna whose wireless communication is controlled by the communication control unit from the first antenna to the second antenna.

(6)

The first information processing device according to any one of (1) to (3), in which the first antenna is connected in parallel with the second antenna.

(7)

The first information processing device according to any one of (1) to (3), in which the first antenna is magnetically coupled to the second antenna.

(8)

An information processing method by a processor, the processor controlling wireless communication with an external device via a first antenna and controlling wireless communication with the external device via a second antenna of a second information processing device through a first connection portion, a first information processing device that includes the processor being engageable with the second information processing device, the information processing method, by the processor, including:

controlling reading of identification information from a memory on a basis of wireless communication with the external device via the first antenna or the second antenna.

(9)

A program for causing a computer to function as a first information processing device including a communication control unit configured to control wireless communication with an external device via a first antenna and control wireless communication with the external device via a second antenna of a second information processing device through a first connection portion, in which the first information processing device is engageable with the second information processing device, and the communication control unit controls reading of identification information from a memory on the basis of wireless communication with the external device via the first antenna or the second antenna.

(10)

A second information processing device including:

a second connection portion that is connected to a first information processing device;

a second antenna configured to perform wireless communication with an external device under the control of a communication control unit of the first information processing device via the second connection portion;

a user interface unit; and an operation control unit configured to control, in a case where the second antenna receives an operation request from the external device, the user interface unit so that output is performed by the user interface unit on the basis of the operation request, in which the second information processing device is engageable with the first information processing device.

(11)

The second information processing device according to (10), in which in a case where the second antenna receives the operation request from the external device, the operation control unit reads operation information corresponding to the operation request from a memory of the first information processing device and controls the user interface unit so that output is performed by the user interface unit on the basis of the operation information.

(12)

The second information processing device according to (10) or (11), in which in a case where the second antenna receives the operation request from the external device, the operation control unit acquires operation information from the operation request and controls the user interface unit so that output is performed by the user interface unit on the basis of the operation information.

(13)
The second information processing device according to any one of (10) to (12), further including
a power supply unit configured to generate power supply on the basis of a magnetic field detected by the second antenna.

(14)
The second information processing device according to any one of (10) to (13), further including
a battery.

(15)
The second information processing device according to any one of (10) to (14), in which
the user interface unit is configured to accept operating information from a user, and
in a case where the second antenna receives an operating information request from the external device, the second antenna transmits the operating information to the external device.

(16)
An information processing method, by a processor, including
in a case where a second antenna receives an operation request from an external device under the control of a communication control unit of a first information processing device via a second connection portion, controlling a user interface unit so that output is performed by the user interface unit on the basis of the operation request, in which
a second information processing device including the processor is engageable with the first information processing device.

(17)
A program for causing a computer to function as
a second information processing device including an operation control unit configured to control, in a case where a second antenna receives an operation request from an external device under control of a communication control unit of a first information processing device via a second connection portion, a user interface unit so that output is performed by the user interface unit on the basis of the operation request, in which
the second information processing device is engageable with the first information processing device.

(18)
An information processing system including:
a first information processing device; and
a second information processing device, in which
the first information processing device is engageable with the second information processing device,
the first information processing device includes
a first connection portion that is connected to the second information processing device,
a first antenna configured to perform wireless communication with an external device, and
a communication control unit configured to control wireless communication with the external device via the first antenna and control wireless communication with the external device via a second antenna of the second information processing device through the first connection portion,
the communication control unit controls reading of identification information from a memory on the basis of wireless communication with the external device via the first antenna or the second antenna,
the second information processing device includes
a second connection portion that is connected to the first information processing device,
the second antenna,
a user interface unit, and
an operation control unit configured to control, in a case where the second antenna receives an operation request from the external device, the user interface unit so that output is performed by the user interface unit on the basis of the operation request.

REFERENCE SIGNS LIST

100 Information processing system
200 Game console main body
201 Screen
300 Pad device
400 Game device
401 RFID tag
410 Figure
420 Basic pedestal
4210 Upper lid
4220 Substrate
4221 IC chip
4221a Communication control unit
4221b Memory
4221c External interface
4222 Extended pedestal connection portion
4223 Extended pedestal detection unit
4224 Antenna
4225 Switching unit
4230 Lower lid
4231 Hole
430 Extended pedestal
4310 Upper lid
4320 Substrate
4321 MCU
4321a External interface
4321b Operation control unit
4321c External interface
4322 Basic pedestal connection portion
4323 Switch
4323Z Input unit
4324 LED
4324Z Output unit
4325 Input/output unit
4326 Antenna
4327 Rectifier circuit unit
4328 Power supply circuit unit
4330 Lower lid
4331 Hole
440 Pad antenna

The invention claimed is:
1. A first information processing device, comprising:
a first connection portion;
a first antenna configured to execute wireless communication with an external device;
a memory configured to store identification information; and
circuitry configured to:
detect a connection state indicating a connection between the first connection portion and a second information processing device, wherein the second information processing device is different from the first information processing device;
switch a connection of the first information processing device from the first antenna of the first information processing device to a second antenna of the second information processing device based on the detected connection state, wherein the second antenna of the second information processing device is external to the first information processing device;
control, based on the detected connections state of the switch, the wireless communication with the external device via the second antenna of the second information processing device through the first connection portion, wherein the first information processing device is engageable with the second information processing device; and control readout of the identification information from the memory based on the wireless communication with the external device via the second antenna.

2. The first information processing device according to claim 1, wherein the identification information is related to a figure on the first information processing device.

3. The first information processing device according to claim 1, wherein in a case where the connection state indicates that the first connection portion is disconnected from the second information processing device, the first antenna is further configured to receive operation information from the external device, and the circuitry is further configured to write the operation information into the memory.

4. The first information processing device according to claim 1, wherein the first antenna is connected in parallel with the second antenna.

5. The first information processing device according to claim 1, wherein the first antenna is magnetically coupled to the second antenna.

6. The first information processing device according to claim 1, wherein the circuitry is further configured to:

receive a control signal from the second information processing device; and detect, based on the received control signal, the connection state indicating the connection between the first connection portion and the second information processing device.

7. An information processing method, comprising:

detecting a connection state indicating a connection between a first connection portion of a first information processing device and a second information processing device, wherein the second information processing device is different from the first information processing device;

switching a connection of the first information processing device from a first antenna of the first information processing device to a second antenna of the second information processing device based on the detected connection state, wherein the second antenna of the second information processing device is external to the first information processing device;

controlling, based on the detected connections state of the switch, wireless communication with an external device via the second antenna of the second information processing device through the first connection portion, wherein the first information processing device is engageable with the second information processing device; and controlling readout of identification information from a memory based on the wireless communication with the external device via the second antenna.

8. A non-transitory computer-readable medium having stored thereon, computer-executable instructions which, when executed by a processor of a first information processing device, cause the processor to execute operations, the operations comprising:

detecting a connection state indicating a connection between a first connection portion of the first information processing device and a second information processing device, wherein the second information processing device is different from the first information processing device;

switching a connection of the first information processing device from a first antenna of the first information processing device to a second antenna of the second information processing device based on the detected connection state, wherein the second antenna of the second information processing device is external to the first information processing device;

controlling, based on the detected connections state of the switch, wireless communication with an external device via the second antenna of the second information processing device through the first connection portion, wherein the first information processing device is engageable with the second information processing device; and controlling readout of identification information from a memory based on the wireless communication with the external device via the second antenna.

9. A second information processing device, comprising:

a second connection portion connectable to a first connection portion of a first information processing device, wherein the second information processing device is different from the first information processing device;

a second antenna configured to:

execute wireless communication with an external device under control of first circuitry of the first information processing device via the second connection portion, wherein the first circuitry:

detects a connection state indicating a connection between the first connection portion of the first information processing device and the second connection portion of the second information processing device, and switches a connection of the first information processing device from a first antenna of the first information processing device to the second antenna of the second information processing device based on the detected connection state, wherein the second antenna of the second information processing device is external to the first information processing device; and receive an operation request from the external device;

a user interface unit; and second circuitry configured to control an output of the user interface unit based on the operation request, wherein the second information processing device is engageable with the first information processing device.

10. The second information processing device according to claim 9, wherein the second circuitry is further configured to:

read operation information corresponding to the operation request from a memory of the first information processing device; and control the output of the user interface unit based on the operation information.

11. The second information processing device according to claim 9, wherein the second circuitry is further configured to:

acquire operation information corresponding to the operation request; and control the output of the user interface unit based on the acquired operation information.

12. The second information processing device according to claim 9, further comprising a power supply unit configured to generate power supply based on a magnetic field detected by the second antenna.

13. The second information processing device according to claim 9, further comprising a battery.

14. The second information processing device according to claim 9, wherein
the user interface unit is further configured to accept operating information from a user,
the second antenna is further configured to:
receive an operating information request from the external device, and
transmit the operating information to the external device based on the reception of the operating information request.

15. The second information processing device according to claim 9, wherein
the user interface unit includes an input unit and an output unit,
the input unit includes one of a button, a switching device, or a sensor device, and
the output unit includes one of a light-emitting diode (LED), a vibration motor, or a speaker.

16. The second information processing device according to claim 9, wherein
the second circuitry is further configured to transmit a control signal to the first information processing device, and
the first circuitry of the first information processing device detects, based on the control signal, the connection state indicating the connection between the first connection portion and the second information processing device.

17. An information processing method, comprising:
in a second information processing device comprising a second connection portion and a second antenna that receives an operation request from an external device under control of circuitry of a first information processing device via the second connection portion:
controlling an output of a user interface unit based on the operation request, wherein
the second information processing device is different from the first information processing device,
the second information processing device is engageable with the first information processing device, and
the circuitry:
detects a connection state indicating a connection between a first connection portion of the first information processing device and the second connection portion of the second information processing device, and
switches a connection of the first information processing device from a first antenna of the first information processing device to the second antenna of the second information processing device based on the detected connection state, wherein the second antenna of the second information processing device is external to the first information processing device.

18. A non-transitory computer-readable medium having stored thereon, computer-executable instructions which, when executed by a processor, cause the processor to execute operations, the operations comprising:
in a second information processing device comprising a second connection portion and a second antenna that receives an operation request from an external device under control of circuitry of a first information processing device via the second connection portion:
controlling an output of a user interface unit based on the operation request, wherein
the second information processing device is different from the first information processing device,
the second information processing device is engageable with the first information processing device, and
the circuitry:
detects a connection state indicating a connection between a first connection portion of the first information processing device and the second connection portion of the second information processing device, and
switches a connection of the first information processing device from a first antenna of the first information processing device to the second antenna of the second information processing device based on the detected connection state, wherein the second antenna of the second information processing device is external to the first information processing device.

19. An information processing system, comprising:
a first information processing device; and
a second information processing device different from the first information processing device, wherein
the first information processing device is engageable with the second information processing device,
the first information processing device includes:
a first connection portion;
a first antenna configured to execute wireless communication with an external device;
a memory configured to store identification information; and
first circuitry configured to:
detect a connection state indicating a connection between the first connection portion and the second information processing device;
switch a connection of the first information processing device from the first antenna of the first information processing device to a second antenna of the second information processing device based on the detected connection state, wherein the second antenna of the second information processing device is external to the first information processing device;
control, based on the detected connections state of the switch, the wireless communication with the external device via the second antenna of the second information processing device through the first connection portion; and
control readout of the identification information from the memory based on the wireless communication with the external device via the second antenna, and
the second information processing device includes:
a second connection portion connected to the first information processing device;
the second antenna configured to receive an operation request from the external device;
a user interface unit; and
second circuitry configured to control an output of the user interface unit based on the operation request.

* * * * *